US011886079B2

(12) United States Patent
Oba et al.

(10) Patent No.: US 11,886,079 B2
(45) Date of Patent: Jan. 30, 2024

(54) WAVELENGTH CONVERSION MEMBER, LIGHT EMITTING DEVICE, AND LIQUID CRYSTAL DISPLAY DEVICE

(71) Applicant: FUJIFILM Corporation, Tokyo (JP)

(72) Inventors: Tatsuya Oba, Kanagawa (JP); Isao Fujiwara, Kanagawa (JP); Shinji Hikita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/064,036

(22) Filed: Dec. 9, 2022

(65) Prior Publication Data

US 2023/0152629 A1  May 18, 2023

Related U.S. Application Data

(63) Continuation of application No. PCT/JP2021/022032, filed on Jun. 10, 2021.

(30) Foreign Application Priority Data

Jun. 11, 2020 (JP) .................. 2020-101484
Dec. 21, 2020 (JP) .................. 2020-211442

(51) Int. Cl.
  *G02F 1/1335* (2006.01)
  *G02F 1/13357* (2006.01)
(52) U.S. Cl.
  CPC .. *G02F 1/133614* (2021.01); *G02F 1/133603* (2013.01)
(58) Field of Classification Search
  CPC ......... G02F 1/133606; G02F 1/133603; G09F 9/00; F21Y 2115/10; F21Y 2115/30;
  (Continued)

(56) References Cited

U.S. PATENT DOCUMENTS

2012/0113672 A1   5/2012  Dubrow et al.
2016/0195229 A1*  7/2016  Tokinoya .......... G02F 1/133603
                                                      362/351
(Continued)

FOREIGN PATENT DOCUMENTS

JP  2013-093425 A   5/2013
JP  2013-197301 A   9/2013
(Continued)

OTHER PUBLICATIONS

International Search Report issued in PCT/JP2021/022032 dated Aug. 31, 2021.

(Continued)

*Primary Examiner* — Mariam Qureshi
(74) *Attorney, Agent, or Firm* — Edwards Neils LLC; Jean C. Edwards, Esq.

(57) ABSTRACT

The wavelength conversion member includes a wavelength conversion layer containing quantum dots, in which the wavelength conversion layer is provided between two substrates, at least one of the two substrates has a barrier layer, the wavelength conversion member has a total thickness of 120 μm or less, the wavelength conversion member has a rub resistance of 100 g or more, and the wavelength conversion member exhibits a bend resistance of a mandrel diameter of 4 mm or less in a bend resistance test carried out according to a cylindrical mandrel method specified in JIS K 5600-5-1:1999.

18 Claims, 8 Drawing Sheets

(58) Field of Classification Search
CPC ......... G02B 6/0065; Y02B 20/00; F21V 9/30; F21V 9/38
See application file for complete search history.

(56) References Cited

U.S. PATENT DOCUMENTS

| | | |
|---|---|---|
| 2019/0194531 A1 | 6/2019 | Oba et al. |
| 2019/0251897 A1 | 8/2019 | Toyama et al. |
| 2019/0258098 A1 | 8/2019 | Oba et al. |
| 2020/0017762 A1 | 1/2020 | Mansei et al. |
| 2021/0087429 A1* | 3/2021 | Leppäjärvi ............ C08F 283/12 |

FOREIGN PATENT DOCUMENTS

| | | |
|---|---|---|
| JP | 2013-544018 A | 12/2013 |
| JP | 2016-159445 A | 9/2016 |
| JP | 2020-049836 A | 4/2020 |
| WO | 2018/043616 A1 | 3/2018 |
| WO | 2018/055766 A1 | 3/2018 |
| WO | 2018/084280 A1 | 5/2018 |
| WO | 2018/084289 A1 | 5/2018 |

OTHER PUBLICATIONS

Written Opinion issued in PCT/JP2021/022032 dated Aug. 31, 2021.
International Preliminary Report on Patentability completed by WIPO dated Dec. 13, 2022 in connection with International Patent Application No. PCT/JP2021/022032.

* cited by examiner

WAVELENGTH CONVERSION MEMBER, LIGHT EMITTING DEVICE, AND LIQUID CRYSTAL DISPLAY DEVICE

CROSS-REFERENCE TO RELATED APPLICATIONS

This application is a Continuation of PCT International Application No. PCT/JP2021/022032 filed on Jun. 10, 2021, which was published under PCT Article 21(2) in Japanese, and which claims priority under 35 U.S.C. § 119(a) to Japanese Patent Application No. 2020-101484 filed on Jun. 11, 2020 and Japanese Patent Application No. 2020-211442 filed on Dec. 21, 2020. The above applications are hereby expressly incorporated by reference, in their entirety, into the present application.

BACKGROUND OF THE INVENTION

1. Field of the Invention

The present invention relates to a wavelength conversion member, a light emitting device, and a liquid crystal display device.

2. Description of the Related Art

A flat panel display such as a liquid crystal display device (hereinafter, also referred to as LCD) is used as a space-saving image display apparatus with low power consumption, and its application is expanding year by year. The liquid crystal display device is usually composed of at least a light emitting device and a liquid crystal cell.

In recent years, a quantum dot (also referred to as QD) has been attracting attention as a light emitting material for flat panel displays (see JP2013-544018A and WO2018/055766).

SUMMARY OF THE INVENTION

The light emitting device disposed in a liquid crystal display device can have at least a member containing quantum dots and a light source. Such a member is generally called a wavelength conversion member. For example, in a case where light is incident on a wavelength conversion member from a light source, quantum dots are excited by the incident light to emit fluorescence. Here, in a case of using quantum dots having different light-emitting properties, the fluorescence emitted by the quantum dots and/or each bright line light of red light, green light, and blue light as the light emitted from the light source and passed through the wavelength conversion member can be emitted from the wavelength conversion member. This makes it possible to realize white light. Since the fluorescence emitted by the quantum dots has a small half-width, the obtained white light has high brightness and excellent color reproducibility. In accordance with advances in three-wavelength light source technology using such quantum dots, the color reproduction range has been expanded from 72% to 100% compared to the current TV standards (Full High Definition (FHD), National Television System Committee (NTSC)).

Reducing a thickness of a member containing such quantum dots leads to the reduction of a thickness of a light emitting device including the member and further the reduction of a thickness of a liquid crystal display device including the light emitting device, which is thus preferable. However, as a result of studies on reducing the thickness of the member by the present inventors, it has become clear that a thin wavelength conversion member tends to cause a phenomenon of partial failure of light emission (hereinafter, referred to as "non-light emission failure").

An aspect of the present invention is to provide a wavelength conversion member capable of achieving both reduction in thickness and suppression of occurrence of non-light emission failure.

One aspect of the present invention relates to a wavelength conversion member comprising a wavelength conversion layer containing quantum dots,
in which the wavelength conversion layer is provided between two substrates,
at least one of the two substrates has a barrier layer,
the wavelength conversion member has a total thickness of 120 μm or less,
the wavelength conversion member has a rub resistance of 100 g or more, and
the wavelength conversion member exhibits a bend resistance of a mandrel diameter of 4 mm or less in a bend resistance test carried out according to a cylindrical mandrel method specified in JIS K 5600-5-1:1999.

In one embodiment, the wavelength conversion member can satisfy the expression: $1.0 \times 10^5 < (E_w \times d_w^3)/(E_b \times d_b^3) < 1.0 \times 10^9$. In the expression, $E_b$ is an elastic modulus of the barrier layer, $d_b$ is a thickness of the barrier layer, $E_w$ is an elastic modulus of the wavelength conversion layer, and $d_w$ is a thickness of the wavelength conversion layer, where a unit of the elastic modulus is GPa (gigapascal), and a unit of the thickness is m.

In one embodiment, the thickness of the barrier layer can be in a range of 0.03 to 0.60 μm.

In one embodiment, the barrier layer can be a layer containing an inorganic oxide selected from the group consisting of a silicon oxide and an aluminum oxide.

In one embodiment, the thickness of the wavelength conversion layer can be 70 μm or less.

In one embodiment, the substrate having the barrier layer can include the barrier layer and a support, and a thickness of the support can be in a range of 10 to 30 km.

In one embodiment, the wavelength conversion member can have the barrier layer between the wavelength conversion layer and the support.

In one embodiment, the substrate having a barrier layer can further have an organic layer containing a (meth)acrylamide compound.

In one embodiment, the substrate having a barrier layer can further have an organic layer containing a compound having an alicyclic structure.

In one embodiment, the wavelength conversion member can have the organic layer between the barrier layer and the wavelength conversion layer.

In one embodiment, the wavelength conversion layer may further contain a (meth)acrylic resin.

In one embodiment, the wavelength conversion layer can have a region containing the quantum dots and a resin layer region having a plurality of concave portions, and the region containing the quantum dots can be included in the concave portion.

In one embodiment, the wavelength conversion layer can be a cured product obtained by curing a polymerizable composition containing the quantum dots into a film.

One aspect of the present invention relates to a light emitting device including the wavelength conversion member and a light source.

In one embodiment, the light source can be a light source selected from the group consisting of a blue light emitting diode and an ultraviolet light emitting diode.

One aspect of the present invention relates to a liquid crystal display device having the light emitting device and a liquid crystal cell.

According to one aspect of the present invention, it is possible to provide a thin wavelength conversion member in which the occurrence of non-light emission failure is suppressed. In addition, according to one aspect of the present invention, it is possible to provide a light emitting device including the wavelength conversion member, and a liquid crystal display device including the light emitting device.

DESCRIPTION OF THE PREFERRED EMBODIMENTS

Figure 1:
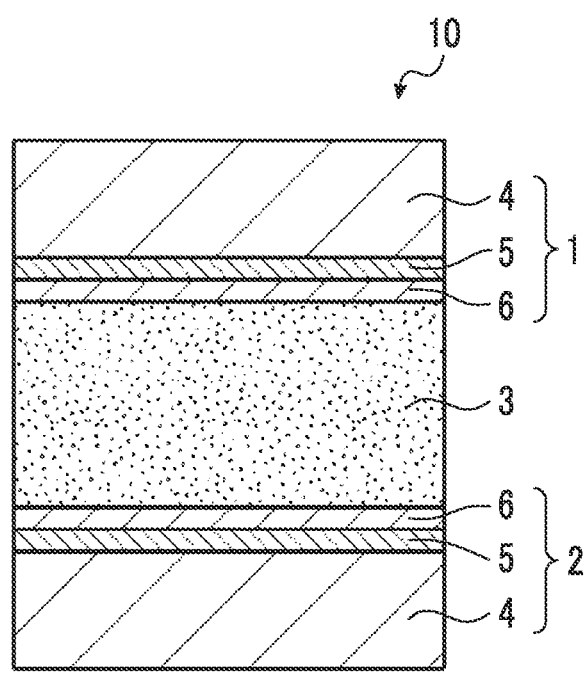
FIG. 1 is a cross-sectional view showing an example of a wavelength conversion member.

The following description may be based on representative embodiments of the present invention. However, the present invention is not limited to such embodiments. In the present invention and the present specification, any numerical range expressed using "to" refers to a range including the numerical values before and after the "to" as a lower limit value and an upper limit value, respectively.

In the present invention and the present specification, the "half-width" of a peak refers to a width of the peak at a peak height of ½. In addition, light having a light emission center wavelength in a wavelength range of 400 nm or longer and shorter than 500 nm is referred to as blue light, light having a light emission center wavelength in a wavelength range of 500 nm or longer and shorter than 600 nm is referred to as green light, and light having a light emission center wavelength in a wavelength range of 600 nm or longer and 680 nm or shorter is referred to as red light. In addition, light having a light emission center wavelength in a wavelength range of 280 nm or longer and shorter than 400 nm is referred to as ultraviolet light.

[Wavelength Conversion Member]

One aspect of the present invention relates to a wavelength conversion member having a wavelength conversion layer containing quantum dots. The wavelength conversion member has the wavelength conversion layer between two substrates, and at least one of the two substrates has a barrier layer. The wavelength conversion member has a total thickness of 120 µm or less, has a rub resistance of 100 g or more, and exhibits a bend resistance of a mandrel diameter of 4 mm or less in the bend resistance test carried out according to the cylindrical mandrel method specified in JIS K 5600-5-1:1999.

The wavelength conversion member is a thin wavelength conversion member having a total thickness of 120 µm or less. In addition, the wavelength conversion member has a barrier layer on at least one of the two substrates. In the present invention and the present specification, the "barrier layer" refers to a layer containing at least one inorganic substance. The barrier layer can function as a protective layer for suppressing the invasion of oxygen and/or water into the wavelength conversion layer in the wavelength conversion member. However, as a result of studies by the present inventors, it has become clear that non-light emission failure is likely to occur in a case where the wavelength conversion member having the barrier layer is thinned to a total thickness of 120 µm or less. The present inventors consider that the stiffness of the wavelength conversion member is reduced due to such reduction in thickness, and the wavelength conversion member is likely to be deformed (for example, to be easily bent) during handling in steps such as examination and assembly. The present inventors have inferred that, in a case where the wavelength conversion member is deformed, the barrier layer, which is a layer containing an inorganic substance and tends to crack due to an external force, is damaged, and oxygen and/or water invades into the wavelength conversion layer from the damaged portion, resulting in localized deterioration of the quantum dots in the wavelength conversion layer.

As a result of extensive studies based on such an inference, the present inventors have newly found that it is possible to suppress the occurrence of the non-light emission failure by setting the rub resistance and the bend resistance of the wavelength conversion member within the above ranges. It is inferred that this is because the occurrence of deformation can be suppressed in the wavelength conversion member whose rub resistance and bend resistance are in the above ranges even in a case where the wavelength conversion member is thin with a total thickness of 120 µm or less, and as a result, the occurrence of damage to the barrier layer due to deformation can be reduced. In this regard, the present invention is not limited to the inferences described in the present specification.

Hereinafter, the wavelength conversion member will be described in more detail.

<Total Thickness of Wavelength Conversion Member>

The total thickness of the wavelength conversion member is 120 µm or less. The wavelength conversion member having a total thickness of 120 µm or less is preferable from the viewpoint of reducing the thickness of a light emitting device and further reducing the thickness of a liquid crystal display device. From this point, the total thickness of the wavelength conversion member is preferably 110 µm or less, more preferably 100 µm or less, and still more preferably 90 µm or less. In addition, the total thickness of the wavelength conversion member can be, for example, 50 µm or more, 55 µm or more, or 60 µm or more, or can be less than the value exemplified here.

The total thickness of the wavelength conversion member in the present invention and the present specification is a value measured using a known measuring instrument for thickness measurement at one randomly selected location of a wavelength conversion member to be measured. It is assumed that the thickness is measured on the order of 1 μm. For example, a contact type film thickness meter (for example, Millimar 1240 manufactured by Mahr GmbH) can be used as the measuring instrument. The same applies to various thicknesses (excluding the thickness of the barrier layer) in the present invention and the present specification.

On the other hand, the thickness of the barrier layer is obtained by the following method.

A cross section in a thickness direction is exposed by a microtome or the like. The cross-sectional observation is carried out on the exposed cross section with a scanning electron microscope, and the thickness at one randomly selected location is defined as the thickness of the barrier layer. It is assumed that the thickness of the barrier layer is measured on the order of 0.01 μm.

<Rub Resistance>

The rub resistance of the wavelength conversion member is 100 g or more. It is considered that having a rub resistance of 100 g or more can contribute to suppressing deformation of a thin wavelength conversion member having a total thickness of 120 μm or less during handling. It is inferred that this leads to suppression of occurrence of non-light emission failure in the wavelength conversion member having a total thickness of 120 μm or less. From this point, the rub resistance of the wavelength conversion member is 100 g or more, preferably 120 g or more, more preferably 140 g or more, still more preferably 160 g or more, even still more preferably 180 g or more, and even still further more preferably 200 g or more. The rub resistance of the wavelength conversion member can be, for example, 1,000 g or less, 950 g or less, 900 g or less, 850 g or less, 800 g or less, 750 g or less, 700 g or less, 650 g or less, 600 g or less, 550 g or less, or 500 g or less. From the above-mentioned points, the larger the value of the rub resistance is, the more preferable it is.

The rub resistance of the wavelength conversion member in the present invention and the present specification is obtained by the following method.

A sample piece having a width of 35 mm and a length of 120 mm is cut out from a randomly selected portion of a wavelength conversion member to be measured. The sample piece is placed in an environment with a temperature of 25° C. and a relative humidity of 60% for 1 hour or more for humidity conditioning and then, in the same environment, an indenter loaded with a vertical load is reciprocally moved on the surface of the sample piece. The surface on which the indenter is reciprocally moved may be a surface on either side of the sample piece. A plurality of different sample pieces cut out from the wavelength conversion member to be measured are used, and the vertical load applied to the indenter is changed for each sample piece. For example, a vertical load can be applied to the indenter by placing a weight on a weight tray provided on the vertical line of the indenter. A SUS (Steel Use Stainless) 304 ball-shaped indenter having a diameter of 5 mm is used as the indenter, and the indenter is reciprocally moved in the longitudinal direction of the sample piece on the surface of the sample piece at a moving speed of 200 mm/min, a one-way moving distance of 50 mm, and a reciprocating number of times of 1 time. The load is changed to 10 g, 50 g, and 100 g, and the load of 100 g or more is changed in increments of 50 g, up to a maximum of 1,000 g.

The above operation can be carried out by a known rubbing testing machine. For example, a surface property tester TRIBOGEAR TYPE: 14 (manufactured by Shinto Scientific Co., Ltd.) can be used as the testing machine.

The sample piece in which the indenter is reciprocally moved on the surface as described above is stored in an environment with a temperature of 85° C. and a relative humidity of 0% for 168 hours, and then placed in an environment with a temperature of 25° C. and a relative humidity of 60% for 30 minutes or more. Then, in the same environment, the surface of the side on which the indenter is reciprocally moved is imaged using a digital camera under a light emitting diode (LED) blue plane light source having a light source wavelength of 450 nm. MB-OBL9X9-B-24-O-ILD (manufactured by Metaphase Technologies Inc.) can be used as the blue plane light source. The imaging is carried out by turning on the blue plane light source under the conditions of a voltage of 19.3 V and a current of 0.88 A, and attaching a long-pass filter to the lens of the digital camera. VIS OG 515 (manufactured by Edmund Optics, Inc.) can be used as the long-pass filter.

In the captured image, gray values of a rubbing test portion (that is, a portion where the indenter is reciprocally moved) and an untested portion are calculated from RGB values using the following expression. Here, R=Red, G=Green, and B=Blue.

$$\text{Gray value} = R \text{ value} \times 0.3 + G \text{ value} \times 0.59 + 1B \text{ value} \times 0.11 \qquad \text{Expression)}$$

Assuming that the gray value of an untested portion is 100%, a minimum value of a load at which the gray value difference is 15% or more (a vertical load applied to the indenter during the reciprocating movement on the surface of the sample piece, which was the above-mentioned gray value difference) is taken as a value of the rub resistance of the wavelength conversion member to be measured.

The rub resistance can be controlled by the thickness of the barrier layer, the elastic modulus of the barrier layer, the thickness of the wavelength conversion layer, and the elastic modulus of the wavelength conversion layer.

<Elastic Modulus>

In the present invention and the present specification, various elastic modulus are values obtained by the following method. The measurement for obtaining the elastic modulus shall be carried out using three different test pieces, and the value of the elastic modulus shall be obtained as an arithmetic average of the measured values obtained for these three test pieces.

In the present invention and the present specification, the elastic modulus of the barrier layer is a value obtained by the following method.

A sample piece having a width of 5 mm and a length of 30 mm is cut out from a randomly selected portion of a wavelength conversion member to be measured. In a case where the barrier layer is not located on the outermost surface layer of the sample piece, the surface of the barrier layer is exposed by a known method. The exposed surface may be a surface on either side of the barrier layer. The sample piece is placed in an environment with a temperature of 25° C. and a relative humidity of 60% for 1 hour or more for humidity conditioning and then, in the same environment, the measurement is carried out on the surface of the barrier layer by a quasi-static partial unloading method (maximum load of 100 μN), and the elastic modulus is obtained from the tangent line at the strain 50 nm position of a strain-stress curve. The measurement can be carried out, for example, on a nanotriboindenter TI-950 (manufactured by Bruker Corporation) using a cube corner indenter.

In the present invention and the present specification, the elastic modulus of the wavelength conversion layer is a value obtained by the following method.

A sample piece having a width of 5 mm and a length of 30 mm is cut out from a randomly selected portion of a wavelength conversion member to be measured. In a case where the wavelength conversion layer is not located on the outermost surface layer of the sample piece, the surface of the wavelength conversion layer is exposed by a known method. The exposed surface may be a surface on either side of the wavelength conversion layer. The sample piece is placed in an environment with a temperature of 25° C. and a relative humidity of 60% for 1 hour or more for humidity conditioning and then, in the same environment, the dynamic viscoelasticity is measured using a dynamic viscoelasticity measuring device with a grip to grip distance of 20 mm, a temperature increase rate of 2° C./min, a measurement temperature range of 0° C. to 50° C., and a frequency of 1 Hz. The value of the storage elastic modulus at a measurement temperature of 25° C. is defined as the elastic modulus of the wavelength conversion layer to be measured. For example, VIBRON: DVA-225 (manufactured by IT Keisoku Seigyo K.K.) can be used as the dynamic viscoelasticity tester.

In addition, in the present invention and the present specification, the elastic modulus of the wavelength conversion member and the elastic modulus of the support of the substrate which will be described in detail later are values obtained by the following method using a universal testing machine. The universal testing machine, also known as a universal material testing machine, is a testing machine for carrying out static tests such as tension, compression, bending, peeling, and tearing, and is broadly classified into an electromechanical system testing machine and a hydraulic system testing machine, either of which can be used. For example, a universal material testing machine TENSILON RTF-1310 (manufactured by Orientec Co., Ltd.) can be used as the universal testing machine.

A sample piece having a width of 10 mm and a length of 150 mm is cut out from a randomly selected portion of a wavelength conversion member to be measured. In a case of obtaining the elastic modulus of the support, a portion other than the target support for which the elastic modulus is to be obtained is removed from the test piece by a known method. The wavelength conversion member or support is placed in an environment with a temperature of 25° C. and a relative humidity of 60% for 1 hour or more for humidity conditioning and then, in the same environment (i.e., in an environment with a temperature of 25° C. and a relative humidity of 60%), using a universal testing machine, the measurement is carried out under the conditions of a sample length of 100 mm (chuck to chuck length of 25 mm) and an elongation rate of 300 mm/min to obtain a strain-stress curve. The elastic modulus is obtained from a tangent line that gives a gradient of a strain of the obtained strain-stress curve of 0.2% to 0.5%.

Regarding the control of the rub resistance, it is preferable that the wavelength conversion member satisfies the expression: $1.0 \times 10^5 < (E_w \times d_w^3)/(E_b \times d_b^3) < 1.0 \times 10^9$. In the above expression, $E_b$ is an elastic modulus of the barrier layer, $d_b$ is a thickness of the barrier layer, $E_w$ is an elastic modulus of the wavelength conversion layer, and $d_w$ is a thickness of the wavelength conversion layer, where the unit of the elastic modulus is GPa, and the unit of the thickness is m. In the preparation of the wavelength conversion member, the rub resistance of the wavelength conversion member can be controlled by adjusting the thickness and the elastic modulus of the barrier layer and the thickness and the elastic modulus of the wavelength conversion layer to satisfy the above expression. In the present invention and the present specification, the value calculated as "$(E_w \times d_w^3)/(E_b \times d_b^3)$" is expressed as a unitless value. The value calculated as "$(E_w \times d_w^3)/(E_b \times d_b^3)$" is preferably more than $1.0 \times 10^5$, more preferably $2.0 \times 10^5$ or more, and still more preferably $1.0 \times 10^6$ or more. In addition, the value calculated as "$(E_w \times d_w^3)/(E_b \times d_b^3)$" is preferably $3.0 \times 10^8$ or less, more preferably $2.5 \times 10^8$ or less, and still more preferably $3.0 \times 10^7$ or less. The thickness and elastic modulus of each of the above layers will be described further later.

<Bend Resistance>

The above-mentioned wavelength conversion member exhibits a bend resistance of a mandrel diameter (hereinafter, also referred to as "$\varphi$") of 4 mm or less in the bend resistance test carried out according to the cylindrical mandrel method specified in JIS K 5600-5-1:1999. It is considered that exhibiting such bend resistance can also contribute to suppressing deformation of a thin wavelength conversion member having a total thickness of 120 μm or less during handling. It is inferred that this leads to suppression of occurrence of non-light emission failure in the wavelength conversion member having a total thickness of 120 μm or less. From this point, $\varphi$ is 4 mm or less and preferably 3 mm or less. In addition, $\varphi$ can be, for example, 2 mm or more.

The bend resistance of the wavelength conversion member in the present invention and the present specification is obtained by the following method by the bend resistance test carried out according to the cylindrical mandrel method specified in JIS K 5600-5-1:1999.

A test piece having a width of 35 mm and a length of 120 mm is cut out from a randomly selected portion of a wavelength conversion member to be measured. The test piece is placed in an environment with a temperature of 25° C. and a relative humidity of 60% for 1 hour or more for humidity conditioning and then, in the same environment, the bend resistance test is carried out according to the cylindrical mandrel method specified in JIS K 5600-5-1:1999. The mandrel is one with a diameter of 2 mm, 3 mm, 4 mm, 5 mm, 6 mm, 8 mm, 10 mm, 12 mm, 16 mm, 20 mm, 25 mm, or 32 mm as described in item 3.1.2 of JIS K 5600-5-1:1999. The mandrel may be placed on the surface of either side of the test piece. A plurality of different sample pieces cut out from a wavelength conversion member to be measured are used, and the bend resistance test is carried out using a mandrel having a different diameter for each sample piece.

The test piece subjected to the bend resistance test as described above is stored in an environment with a temperature of 85° C. and a relative humidity of 0% for 168 hours, and then placed in an environment with a temperature of 25° C. and a relative humidity of 60% for 30 minutes or more. Then, in the same environment, the surface of the side on which the mandrel is placed is imaged using a digital camera under a light emitting diode (LED) blue plane light source having a light source wavelength of 450 nm. The imaging here is the same as that described above with respect to the imaging carried out for obtaining the rub resistance. In the captured image, gray values of a rubbing test portion (that is, a portion where the indenter is reciprocally moved) and an untested portion are calculated from RGB values using the expression described above in order to obtain the rub resistance.

Assuming that the gray value of the untested portion is 100%, the maximum value of the diameter of the mandrel at which the gray value difference is 15% or more (the diameter of the mandrel placed on the surface of the sample piece, which was the above-mentioned gray value difference) is taken as a value of the bend resistance of the wavelength conversion member to be measured.

Regarding the control of the bend resistance, it is preferable that the wavelength conversion member satisfies the expression: $1.0 \times 10^5 < E_t \times d_t^3 < 5.0 \times 10^6$. In the above expression, $E_t$ is an elastic modulus of the wavelength conversion member, and $d_t$ is a thickness (total thickness) of the wavelength conversion member, where the unit of the elastic modulus is GPa, and the unit of the thickness is m. In the preparation of the wavelength conversion member, the bend resistance of the wavelength conversion member can be controlled by adjusting the thickness and the elastic modulus of the wavelength conversion member to satisfy the above expression. In the present invention and the present specification, the value calculated as "$E_t \times d_t^3$" is expressed as a unitless value.

The elastic modulus of the wavelength conversion member is not particularly limited. It is preferable that the elastic modulus and the thickness (total thickness) of the wavelength conversion member satisfy the above expression from the viewpoint of controlling the bend resistance of the wavelength conversion member. The elastic modulus of the wavelength conversion member can be, for example, 1.0 GPa or more, 2.0 GPa or more, or 3.0 GPa or more. In addition, in one embodiment, the elastic modulus of the wavelength conversion member can be 10.0 GPa or less, 8.0 GPa or less, or 6.0 GPa or less. The elastic modulus of the wavelength conversion member can be adjusted by the elastic modulus of various layers including the wavelength conversion member and/or the support which will be described in detail later.

Hereinafter, the wavelength conversion member will be described in more detail.

<Wave Conversion Layer>

(Quantum Dot)

The wavelength conversion member has a wavelength conversion layer containing quantum dots. The quantum dots can be excited by excitation light to emit fluorescence.

The wavelength conversion layer may contain only one type of quantum dot, or may contain two or more types of quantum dots having different light-emitting properties. Known quantum dots include a quantum dot (A) having a light emission center wavelength in a wavelength range of 600 nm or longer and 680 nm or shorter, a quantum dot (B) having a light emission center wavelength in a wavelength range of 500 nm or longer and shorter than 600 nm, and a quantum dot (C) having a light emission center wavelength in a wavelength range of 400 nm or longer and shorter than 500 nm. The quantum dot (A) can be excited by excitation light to emit red light, the quantum dot (B) can be excited by excitation light to emit green light, and the quantum dot (C) can be excited by excitation light to emit blue light. For example, in a case where blue light as excitation light is incident on a wavelength conversion member containing quantum dots (A) and quantum dots (B), white light can be realized by red light emitted by the quantum dots (A), green light emitted by the quantum dots (B), and blue light that has passed through the wavelength conversion member. In addition, in a case where ultraviolet light as excitation light is incident on a wavelength conversion member containing quantum dots (A), quantum dots (B), and quantum dots (C), white light can be realized by red light emitted by the quantum dots (A), green light emitted by the quantum dots (B), and blue light emitted by the quantum dots (C).

Examples of the quantum dot include a core-shell type semiconductor nanoparticle. Generally, a semiconductor particle having a particle size of 100 nm or less (for example, several nm to several tens of nm) can be called a semiconductor nanoparticle. Examples of the core include a II-VI group semiconductor nanoparticle, a III-V group semiconductor nanoparticle, and a multicomponent semiconductor nanoparticle. Specific examples of the core include CdSe, CdTe, CdS, ZnS, ZnSe, ZnTe, InP, InAs, and InGaP. However, the core is not limited thereto. CdSe, CdTe, InP, and InGaP are preferable because these core materials can emit visible light with high efficiency. CdS, ZnS, ZnO, GaAs and/or a complex thereof can be used as the shell. However, the core is not limited thereto. For quantum dots, reference can be made to, for example, known techniques such as paragraphs [0060] to [0066] of JP2012-169271A and paragraphs [0070] to [0076] of WO2018/186300. As the quantum dot, a commercially available product can be used, and a quantum dot prepared by a known method can also be used. The light-emitting properties of the quantum dot can usually be adjusted by the composition and/or size of the particle.

In the wavelength conversion layer, the content of the quantum dots can be, for example, in a range of 0.1% to 10.0% by mass with respect to the mass of the wavelength conversion layer (that is, assuming that the mass of the wavelength conversion layer is 100% by mass). In a case where two or more types of quantum dots are contained, the content of the quantum dots refers to a total content of those quantum dots. The same applies to the contents of various components in the present invention and the present specification. In addition, as will be described later, in a case where the wavelength conversion layer is formed of a polymerizable composition, the content of the quantum dots in the polymerizable composition is, for example, in a range of 0.1% to 10.0% by mass with respect to the total amount of the composition. In the present invention and the present specification, with respect to the polymerizable composition, the content of each component with respect to the total amount of the composition is intended to refer to a content calculated assuming that a total content of all the components excluding a solvent is 100.0% by mass in a case where the polymerizable composition contains the solvent. In a case where the polymerizable composition does not contain a solvent, the content of each component with respect to the total amount of the composition is intended to refer to a content calculated assuming that a total content of all the components contained in the composition is 100.0% by mass.

(Matrix)

The wavelength conversion layer can be a layer containing quantum dots in a matrix, and can be a layer in which the quantum dots are dispersed in the matrix. The matrix can include a resin, and the resin can be a polymer of one or more polymerizable compounds. Specifically, the wavelength conversion layer can be a layer containing a cured product obtained by curing a polymerizable composition containing one or more types of quantum dots and one or more types of polymerizable compounds. In the present invention and the present specification, the "polymerizable composition" is a composition containing at least one polymerizable compound, and has a property of being cured by being subjected to a polymerization treatment such as light irradiation or heating. In addition, the "polymerizable compound" is a compound containing one or more polymerizable functional groups in one molecule. The "polymerizable functional group" is a group that can participate in a polymerization reaction, and the "(meth)acryloyl group" which will be described later is a polymerizable functional group.

In one embodiment, the wavelength conversion layer can contain quantum dots and a (meth)acrylic resin. In the present invention and the present specification, the "(meth) acrylic resin" refers to a polymer of (meth)acrylate. The polymer includes a homopolymer and a copolymer. In addition, in the present invention and the present specification, the "(meth)acrylate" refers to a compound containing one or more (meth)acryloyl groups in one molecule, and the term "(meth)acryloyl group" is used to indicate one or both of an acryloyl group and a methacryloyl group. The functionality in "(meth)acrylate" refers to the number of (meth) acryloyl groups contained in one (meth)acrylate molecule. With regard to (meth)acrylate, the "monofunctional" refers to that the number of (meth)acryloyl groups contained in one molecule is one, and the "polyfunctional" refers to that the number of (meth)acryloyl groups contained in one molecule is two or more. In addition, the (meth)acryloyl group can be included in the (meth)acrylate in the form of a (meth) acryloyloxy group. The term "(meth)acryloyloxy group" is used to indicate one or both of an acryloyloxy group and a methacryloyloxy group.

The wavelength conversion layer containing quantum dots and a (meth)acrylic resin can be a layer containing a cured product obtained by curing a polymerizable composition containing one or more types of quantum dots and one or more types of (meth)acrylates.

Hereinafter, various components that can be contained in the polymerizable composition will be described.

(Meth)Acrylate

The polymerizable composition can contain one or more (meth)acrylates selected from the group consisting of a polyfunctional (meth)acrylate and a monofunctional (meth) acrylate, and preferably contains at least one or more polyfunctional (meth)acrylates.

The polyfunctional (meth)acrylate may be, for example, a difunctional (meth)acrylate. Specific examples of the difunctional (meth)acrylate include neopentyl glycol di(methyl)acrylate, 1,9-nonanediol di(meth)acrylate, dipropylene glycol di(meth)acrylate, tripropylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, and dicyclopentanyl di(meth)acrylate.

In a case where the polymerizable composition contains a difunctional (meth)acrylate, the content thereof is preferably 5.0 parts by mass or more and more preferably in a range of 10.0 to 80.0 parts by mass with respect to 100 parts by mass of the total amount of the polymerizable compound contained in the polymerizable composition. It is preferable that the content of the difunctional (meth)acrylate is in the above range from the viewpoint of adjusting the viscosity of the polymerizable composition.

The polyfunctional (meth)acrylate may also be, for example, a tri- or higher functional (meth)acrylate. Specific examples of the tri- or higher functional (meth)acrylate include epichlorohydrin (ECH)-modified glycerol tri(meth) acrylate, ethylene oxide (EO)-modified glycerol tri(meth) acrylate, propylene oxide (PO)-modified glycerol tri(meth) acrylate, pentaerythritol tri(meth)acrylate, pentaerythritol tetra (meth)acrylate, EO-modified phosphoric acid tri(meth) acrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris (acryloxyethyl) isocyanurate, dipentaerythritol hexa(meth) acrylate, dipentaerythritol penta(meth)acrylate, caprolactone-modified dipentaerythritol hexa(meth)acrylate, dipentaerythritol hydroxy penta(meth)acrylate, alkyl-modified dipentaerythritol penta(meth)acrylate, dipentaerythritol poly(meth)acrylate, alkyl-modified dipentaerythritol tri (meth)acrylate, ditrimethylolpropane tetra(meth)acrylate, pentaerythritol ethoxy tetra(meth)acrylate, and pentaerythritol tetra(meth)acrylate. Among these tri- or higher functional (meth)acrylates, EO-modified glycerol tri(meth)acrylate, PO-modified glycerol tri(meth)acrylate, trimethylolpropane tri(meth)acrylate, EO-modified trimethylolpropane tri(meth)acrylate, PO-modified trimethylolpropane tri(meth)acrylate, dipentaerythritol hexa(meth)acrylate, dipentaerythritol penta(meth)acrylate, pentaerythritol ethoxy tetra(meth)acrylate, and pentaerythritol tetra(meth) acrylate are preferable.

In a case where the polymerizable composition contains a trifunctional (meth)acrylate, the content of the trifunctional (meth)acrylate with respect to 100 parts by mass of the total amount of the polymerizable compound contained in the polymerizable composition is preferably 5.0 parts by mass or more from the viewpoint of the strength of the cured product and is preferably 95.0 parts by mass or less from the viewpoint of suppressing gelation of the composition.

Examples of the monofunctional (meth)acrylate include an acrylic acid, a methacrylic acid, and derivatives thereof. Specific examples of the monofunctional (meth)acrylate include alkyl (meth)acrylates with an alkyl group having 1 to 30 carbon atoms, such as methyl (meth)acrylate, n-butyl (meth)acrylate, isobutyl (meth)acrylate, 2-ethylhexyl (meth) acrylate, isononyl (meth)acrylate, n-octyl (meth)acrylate, lauryl (meth)acrylate, and stearyl (meth)acrylate; aralkyl (meth)acrylates with an aralkyl group having 7 to 20 carbon atoms, such as benzyl (meth)acrylate; alkoxyalkyl (meth) acrylates with an alkoxyalkyl group having 2 to 30 carbon atoms, such as butoxyethyl (meth)acrylate; aminoalkyl (meth)acrylates with a (monoalkyl or dialkyl) aminoalkyl group having 1 to 20 carbon atoms in total, such as N,N-dimethylaminoethyl (meth)acrylate; (meth)acrylates of polyalkylene glycol alkyl ether with an alkylene chain having 1 to 10 carbon atoms and a terminal alkyl ether having 1 to 10 carbon atoms, such as (meth)acrylate of diethylene glycol ethyl ether, (meth)acrylate of triethylene glycol butyl ether, (meth)acrylate of tetraethylene glycol monomethyl ether, (meth)acrylate of hexaethylene glycol monomethyl ether, monomethyl ether (meth)acrylate of octaethylene glycol, monomethyl ether (meth)acrylate of nonaethylene glycol, monomethyl ether (meth)acrylate of dipropylene glycol, monomethyl ether (meth)acrylate of heptapropylene glycol, and monoethyl ether (meth)acrylate of tetraethylene glycol; (meth)acrylates of polyalkylene glycol aryl ether with an alkylene chain having 1 to 30 carbon atoms and a terminal aryl ether having 6 to 20 carbon atoms, such as (meth)acrylate of hexaethylene glycol phenyl ether; (meth)acrylates having 4 to 30 carbon atoms in total, having an alicyclic structure, such as cyclohexyl (meth)acrylate, dicyclopentanyl (meth)acrylate, isobornyl (meth)acrylate, and methylene oxide adduct cyclodecatriene (meth)acrylate; fluorinated alkyl (meth)acrylates having 4 to 30 carbon atoms in total, such as heptadecafluorodecyl (meth)acrylate; (meth)acrylates having a hydroxyl group, such as 2-hydroxyethyl (meth)acrylate, 3-hydroxypropyl (meth)acrylate, 4-hydroxybutyl (meth)acrylate, mono(meth)acrylate of triethylene glycol, tetraethylene glycol mono(meth)acrylate, hexaethylene glycol mono(meth)acrylate, octapropylene glycol mono(meth)acrylate, and mono- or di-(meth)acrylate of glycerol; (meth)acrylates having a glycidyl group, such as glycidyl (meth)acrylate; polyethylene glycol mono(meth)

acrylates with an alkylene chain having 1 to 30 carbon atoms, such as tetraethylene glycol mono(meth)acrylate, hexaethylene glycol mono(meth)acrylate, and octapropylene glycol mono(meth)acrylate; and (meth)acrylamides such as (meth)acrylamide, N,N-dimethyl (meth)acrylamide, N-isopropyl (meth)acrylamide, 2-hydroxyethyl (meth)acryl amide, and acryloylmorpholine. In the present invention and the present specification, the group described includes an unsubstituted group and a group having a substituent. For a group having a substituent, the number of carbon atoms is intended to refer to the number of carbon atoms in a portion excluding the substituent. Examples of the substituent include a hydroxy group and a carboxy group. However, the substituent is not limited thereto.

In a case where the polymerizable composition contains a monofunctional (meth)acrylate, the content thereof is preferably 10.0 parts by mass or more and more preferably in a range of 10.0 to 80.0 parts by mass with respect to 100 parts by mass of the total amount of the polymerizable compound contained in the polymerizable composition. It is preferable that the content of the monofunctional (meth)acrylate is in the above range from the viewpoint of adjusting the viscosity of the polymerizable composition.

The content of (meth)acrylate in the polymerizable composition is preferably in a range of 50% to 99% by mass and more preferably in a range of 70% to 90% by mass with respect to the total amount of the composition. The polymerizable composition may contain only one or more (meth)acrylates as the polymerizable compound, or may contain one or more other polymerizable compounds. The other polymerizable compound is not particularly limited, and reference can be made to, for example, paragraphs [0096] to [0104] of WO2018/186300.

(Additives)

The wavelength conversion layer and the polymerizable composition may optionally contain one or more additives. Specific examples of the additive include a polymerization initiator, a polymer, a viscosity adjuster, a silane coupling agent, a surfactant, an antioxidant, an oxygen getter, a polymerization inhibitor, an inorganic particle, and a light scattering particle. For details such as specific examples of the additive, reference can be made to, for example, paragraphs [0108] to [0169] of WO2018/186300. In addition, the polymerizable composition may not contain a solvent, and may contain one or more types of solvents as required. The type and amount of solvent added are not limited. For example, one type of organic solvent or two or more types of organic solvents can be used as the solvent.

(Thickness of Wavelength Conversion Layer)

The thickness of the wavelength conversion layer can be, for example, 100 μm or less. From the viewpoint of reducing the thickness of the wavelength conversion member, the thickness of the wavelength conversion layer is preferably 90 μm or less, more preferably 80 μm or less, still more preferably 70 μm or less, and even still more preferably 60 μm or less. In addition, in a case where deformation that may cause damage to the barrier layer occurs, it is preferable that the deformation can be easily detected by a visual external examination from the viewpoint of easiness of non-defective product determination. In this respect, a wavelength conversion member having a thickness of the wavelength conversion layer of 70 μm or less is preferable because it has high detectability in a case where such deformation is detected by a visual external examination. From the viewpoint of the detectability, the thickness of the wavelength conversion layer is more preferably 60 μm or less and still more preferably 50 m or less. In addition, the thickness of the wavelength conversion layer can be, for example, 20 m or more or 30 μm or more, and can be less than the value exemplified here from the viewpoint of reducing the thickness of the wavelength conversion member.

Regarding the detectability, in one embodiment, in the wavelength conversion member, the value calculated as "(rub resistance/($E_r \times d_r^3$))×1000000" is preferably 100 or more, more preferably 150 or more, still more preferably 200 or more, even still more preferably 250 or more, and even still further more preferably 300 or more. In the present invention and the present specification, the value calculated as "(rub resistance/($E_r \times d_r^3$))×1000000" is expressed as a unitless value. The above-mentioned value can be, for example, 700 or less, 650 or less, or 600 or less, or can be more than the value exemplified here.

(Elastic Modulus of Wavelength Conversion Layer)

The elastic modulus of the wavelength conversion layer is not particularly limited. It is preferable to form a wavelength conversion layer having an elastic modulus such that the above-described expression is satisfied from the viewpoint of controlling the rub resistance of the wavelength conversion member. The elastic modulus of the wavelength conversion layer can be controlled, for example, by a type of a component for forming the wavelength conversion layer. As an example, in a case where a polymerizable composition containing a polyfunctional (meth)acrylate and a monofunctional (meth)acrylate as the (meth)acrylate is used as the polymerizable composition for forming the wavelength conversion layer, the value of the elastic modulus of the wavelength conversion layer tends to be smaller than a case where a polymerizable composition containing only a polyfunctional (meth)acrylate as the (meth)acrylate is used. In one embodiment, the elastic modulus of the wavelength conversion layer can be 1.0 GPa or more, 1.5 GPa or more, or 2.0 GPa or more. In addition, in one embodiment, the elastic modulus of the wavelength conversion layer can be 6.0 GPa or less, 5.5 GPa or less, 5.0 GPa or less, or 4.5 GPa or less. From the viewpoint of the above-described detectability, the elastic modulus of the wavelength conversion layer is preferably 4.0 GPa or less and more preferably 3.5 GPa or less.

In one embodiment, the wavelength conversion layer can be a cured product obtained by curing a polymerizable composition containing quantum dots into a film. The film shape is used synonymously with the sheet shape. The wavelength conversion layer having such a form can be said to be a continuous layer in which a region containing quantum dots is continuous. On the other hand, in the wavelength conversion layer having the form which will be described later, a region containing quantum dots exists as a discontinuous layer.

Figure 2:
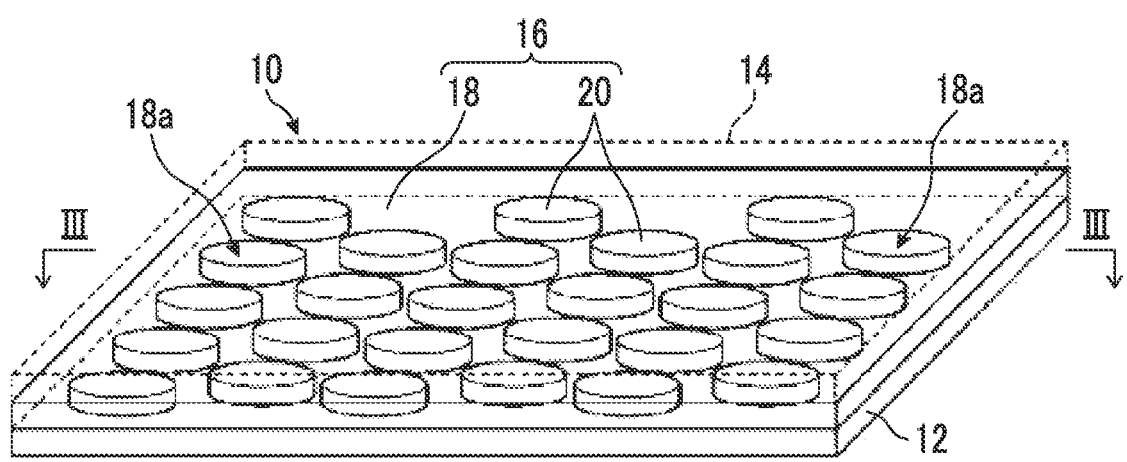
FIG. 2 is a perspective view conceptually showing an example of the wavelength conversion member.
Figure 3:
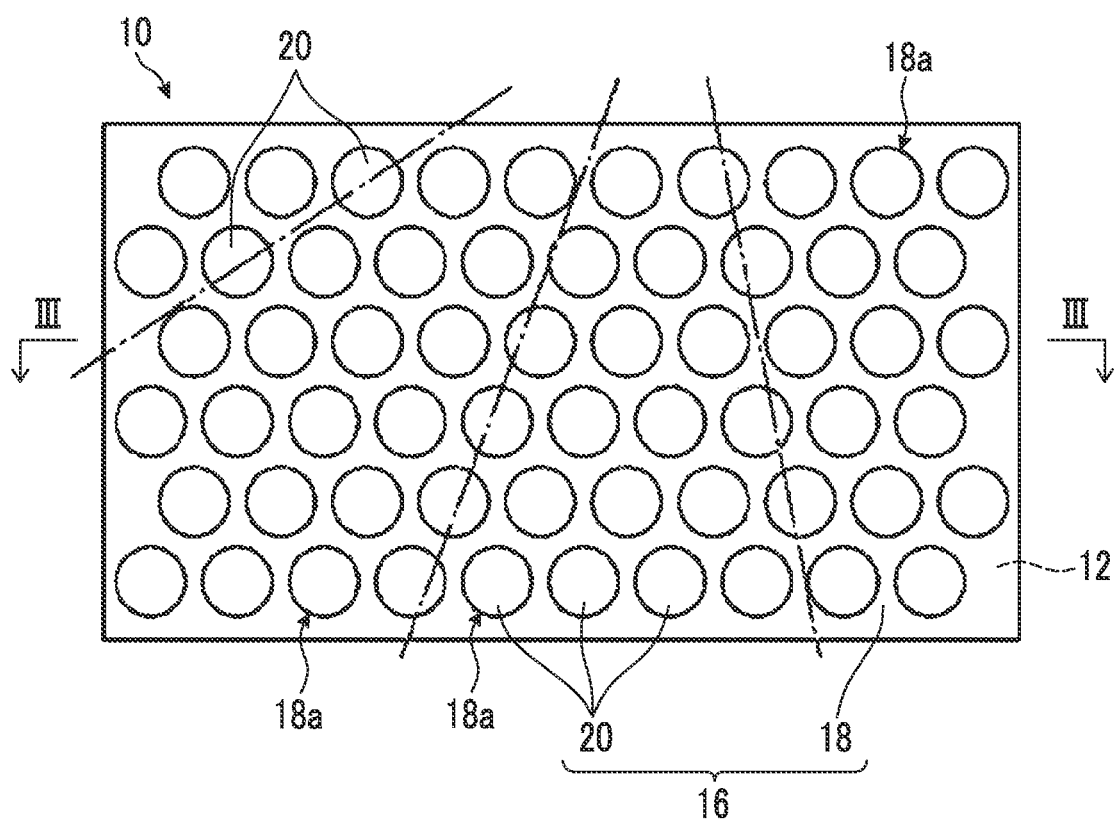
FIG. 3 is a plan view of the wavelength conversion member of FIG. 2.

For a method for manufacturing a wavelength conversion member having a wavelength conversion layer which is a cured product obtained by curing a polymerizable composition containing quantum dots into a film, reference can be made to, for example, paragraphs [0127] to [0155], and FIG. 2 and FIG. 3 of WO2018/016589.

From the viewpoint of easiness of forming a thin wavelength conversion layer, it is preferable to form the wavelength conversion layer as follows. A polymerizable composition containing quantum dots is applied onto one of two substrates used for preparing the wavelength conversion member to form a coating layer. In a case where the coating layer is subjected to a curing treatment (heating and/or light irradiation), the curing treatment is terminated in a case where the polymerization reaction of the polymerizable composition partially proceeds (hereinafter referred to as "partial curing"). Then, the other substrate is bonded to the partially cured coating layer, and then the curing treatment is carried out again to further proceed the curing treatment.

FIG. 1 is a cross-sectional view showing an example of a wavelength conversion member having a wavelength conversion layer which is a cured product obtained by curing a polymerizable composition containing quantum dots into a film. A wavelength conversion member 10 shown in FIG. 2 has a wavelength conversion layer 3 between two substrates 1 and 2. The substrate 1 and the substrate 2 each have a support 4, a barrier layer 5, and an organic layer 6. Details of the substrate will be described later.

In another embodiment, the wavelength conversion layer can be configured to have a region containing quantum dots and a resin layer region having a plurality of concave portions, with the region containing quantum dots included in the concave portion. Specifically, the resin layer can have a plurality of discretely arranged concave portions. Hereinafter, a specific form of the wavelength conversion layer having such an embodiment will be described with reference to the accompanying drawings. However, the forms shown in the drawings are exemplary, and the present invention is not limited to the illustrated forms.

Figure 4:
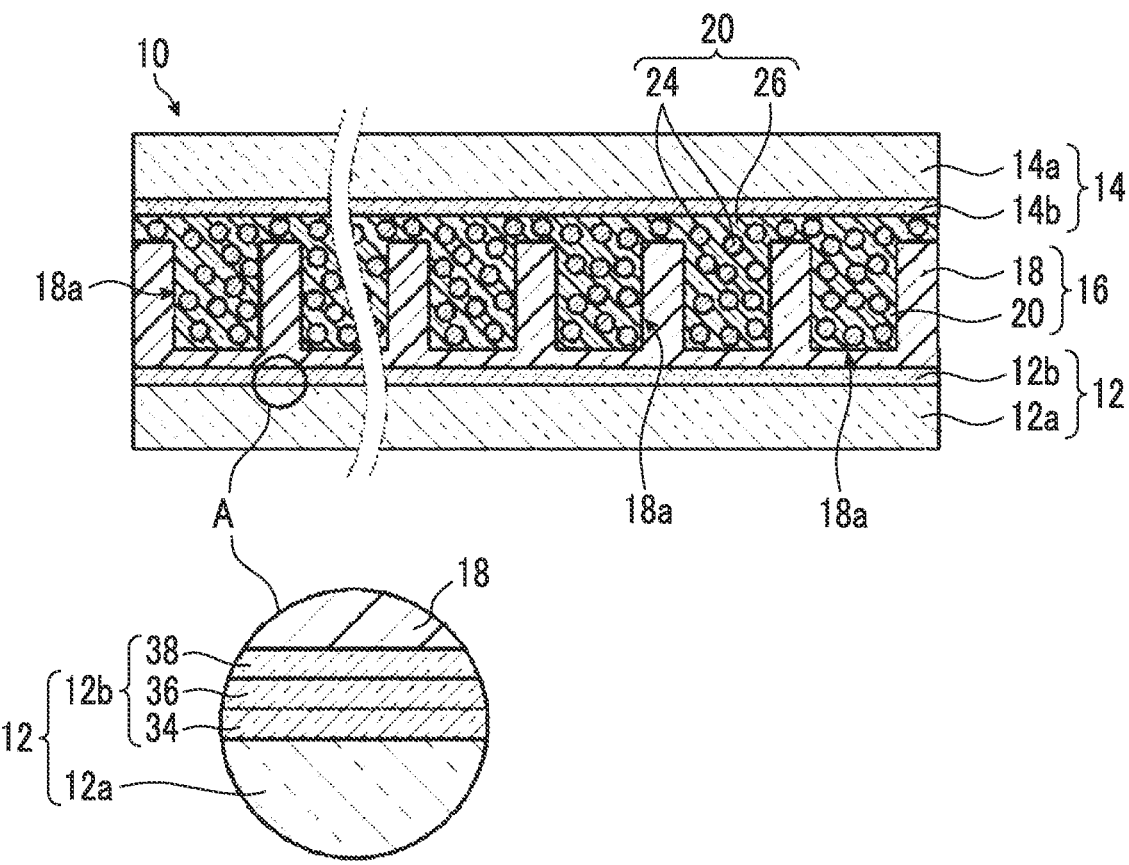
FIG. 4 is a cross-sectional view taken along line III-III of FIG. 2 and FIG. 3.

FIG. 2 shows a perspective view of an example of the wavelength conversion member, FIG. 3 shows a plan view of the wavelength conversion member shown in FIG. 2, and FIG. 4 shows a cross-sectional view taken along line III-III of FIG. 2 and FIG. 3. The plan view of the wavelength conversion member is a view of the wavelength conversion member viewed from a direction orthogonal to a main surface (maximum surface). In the present specification, unless otherwise specified, the plan view is a view of the wavelength conversion member viewed from the second substrate side.

As shown in FIG. 2 to FIG. 4, the wavelength conversion member 10 has a first substrate 12, a second substrate 14, and a wavelength conversion layer 16. In order to clearly show the configuration of the wavelength conversion member 10, the second substrate 14 is shown by a broken line in FIG. 2, and the second substrate 14 is omitted in FIG. 3. The support included in the substrate can be in the form of a film, and is also hereinafter referred to as a support film.

As shown in FIG. 4, the first substrate 12 has, for example, a support film 12a and a barrier layer 12b. The second substrate 14 also has a support film 14a and a barrier layer 14b.

In addition, as shown in FIG. 4, the wavelength conversion layer 16 has a resin layer 18 (see FIG. 5) having concave portions 18a discretely formed in the plane direction (main surface direction) of the wavelength conversion member 10 and a cured product (hereinafter, also referred to as "quantum dot-containing region") 20 formed by curing the above-mentioned polymerizable composition in the concave portions 18a of the resin layer 18. The quantum dot-containing region 20 has quantum dots 24 and a matrix 26 formed by a polymerization reaction of a polymerizable compound. That is, the wavelength conversion layer 16 is provided with a plurality of quantum dot-containing regions 20 spaced apart from each other in a plane direction and containing the quantum dots 24. Specifically, the quantum dot-containing regions, which are regions containing the quantum dots 24, are spaced apart from each other in a plane direction by walls forming the concave portions 18a of the resin layer 18 and are then discretely arranged in the plane direction.

In the present invention and the present specification, more specifically, as shown in FIG. 2 and FIG. 3, the phrase "discretely arranged" means that a plurality of quantum dot-containing regions 20 are arranged in isolation without contacting each other in the plane direction of the first substrate 12, in a case of observing from a direction perpendicular to the main surface of the first substrate 12 (in a case of viewing in a plan view). In other words, the plane direction of the film is a two-dimensional direction along the film surface (main surface of the film). In the example shown in FIG. 2, the quantum dot-containing region is cylindrical and is surrounded by the resin layer 18 in the plane direction of the first substrate 12.

In the wavelength conversion layer 16, the quantum dot-containing regions 20 are discretely arranged in a two-dimensional direction. Therefore, assuming that the wavelength conversion member 10 is a part of a long film, no matter where the wavelength conversion member 10 is cut linearly at any point, as shown by the dashed-dotted line in FIG. 3, the quantum dot-containing regions other than the quantum dot-containing regions that are cut are surrounded by the resin layer 18 and then can be kept sealed in a plane direction. In addition, the quantum dot-containing region that has been cut and exposed to the outside air may lose its original function as a region containing the quantum dots 24. However, since the quantum dot-containing region at the cut position, that is, the quantum dot-containing region at the end portion in a plane direction is usually covered with a member such as a frame that constitutes a display device (display) or the like, it is not required to act as a region containing quantum dots and thus does not affect the performance of the wavelength conversion member. Further, the deactivated quantum dots can serve as a resin layer that protects the quantum dot-containing region that is not exposed to the outside air from the outside air.

In the wavelength conversion layer 16, the first substrate 12 is laminated on the main surface of the wavelength conversion layer 16 on the bottom side of the concave portion 18a of the resin layer 18. That is, the first substrate 12 is laminated on the main surface on the closed surface (closed end) side of the concave portion 18a of the resin layer 18. In the illustrated example, the first substrate 12 is laminated with the barrier layer 12b facing the resin layer 18 side.

On the other hand, the second substrate 14 is laminated on the main surface of the resin layer 18 constituting the wavelength conversion layer 16 opposite to the first substrate 12. That is, the second substrate 14 is laminated on the main surface on the opening surface (opening end) side of the concave portion 18a of the resin layer 18. In the illustrated example, the second substrate 14 is laminated with the barrier layer 14b facing the resin layer 18 side.

Depending on the method of forming the resin layer, in the wavelength conversion layer, the resin layer may have through-holes instead of concave portions, and the through-holes may be filled with quantum dot-containing regions using the substrate as the bottom surface. In this case, one of the two substrates sandwiching the resin layer, that is, the wavelength conversion layer, is regarded as the first substrate, the other substrate is regarded as the second substrate, and the through-holes are regarded as the concave portions of the resin layer, the first substrate is regarded as the bottom of the concave portions of the resin layer, and on the side of the substrate regarded as the second substrate, the end portion of the wall portion of the resin layer 18 may be spaced apart from the second substrate as will be described later.

Here, in the wavelength conversion layer 16, as shown in FIG. 4, the wall portion forming the concave portion 18a of the resin layer 18 is preferably spaced apart from the second substrate 14 at the end portion on the second substrate 14 side. Further, in the wavelength conversion member 10, it is preferable that the quantum dot-containing region is also present between the second substrate 14 and the end portion of the wall portion of the resin layer 18 spaced apart from the second substrate 14 on the second substrate 14 side. In a wavelength conversion member having a configuration in which a wavelength conversion layer in which a quantum dot-containing region is divided into a plurality of regions is sealed with two substrates, the adhesion between the wavelength conversion layer and the substrate can be increased by providing a gap between the substrate and the wall portion that divides the quantum dot-containing region into a plurality of regions, and allowing the quantum dots to exist also in this gap.

In the following description, the second substrate 14 side of the wavelength conversion member 10, that is, the opening side of the concave portion 18a of the resin layer 18 is also referred to as "upper", and the first substrate 12 side, that is, the bottom side of the concave portion 18a of the resin layer 18 is also referred to as "lower".

Specifically, the wall portion forming the concave portion 18a of the resin layer 18 is a portion between the concave portion 18a and the concave portion 18a of the resin layer 18, in the plane direction of the substrate and a portion that forms the plane direction outer periphery of the resin layer 18. That is, the wall portion forming the concave portion 18a of the resin layer 18 is, in other words, a region between the quantum dot-containing region and the quantum dot-containing region in the plane direction of the wavelength conversion layer 16 and a resin layer 18 in the region outside the outermost quantum dot-containing region in the plane direction.

Figure 5:
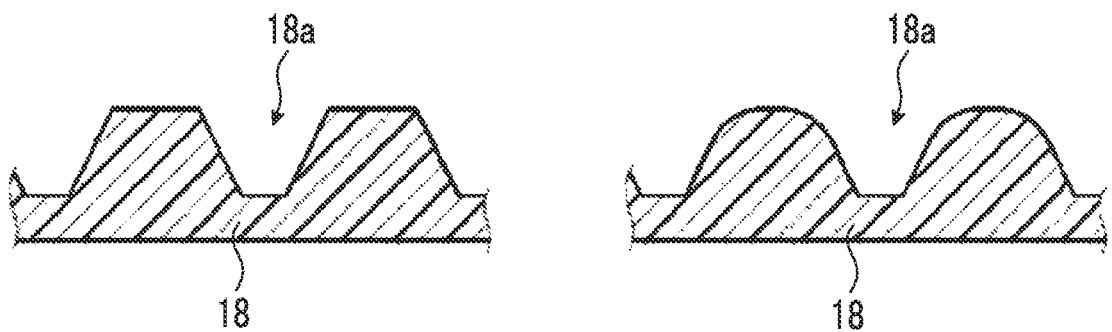
FIG. 5 is a cross-sectional view for illustrating an example of a shape of a resin layer of the wavelength conversion member.

In addition, in the examples shown in FIG. 2 to FIG. 4, the quantum dot-containing region (quantum dot-containing region in the concave portion 18a) is cylindrical, and the wall portion forming the concave portion 18a of the resin layer 18 has a rectangular cross-sectional shape. However, the present invention is not limited thereto, and the cross-sectional shape of the wall portion can be of various shapes. For example, the wall portion forming the concave portion 18a of the resin layer 18 may have a trapezoidal cross-sectional shape as conceptually shown on the left side of FIG. 5, or may have a cross-sectional shape in which a corner portion on the upper surface side of the trapezoid is chamfered into a curved surface as conceptually shown on the right side of FIG. 5. As shown in FIG. 5, the cross-sectional shape of the wall portion of the resin layer 18 is preferably a shape that gradually widens downward from the top, at least in part, preferably from the upper end to the lower end. Here, "downward from the top" means from the end portion on the second substrate 14 side toward the first substrate 12 side. Above all, as shown on the right side of FIG. 5, a shape in which the corner portion of the upper surface on the second substrate side is chamfered is preferable. Such a shape is advantageous in terms of ease of manufacturing a mold for forming the resin layer 18, ease of removal of the mold in a case of forming the resin layer 18, prevention of damage to the resin layer 18 to be formed, and the like.

The upper end of the wavelength conversion layer 16 is spaced apart from the second substrate 14 at the wall portion forming the concave portion 18a of the resin layer 18. In addition, the quantum dot-containing region is provided not only in the concave portion 18a of the resin layer 18 but also between the second substrate 14 and the upper end of the wall portion spaced apart from the second substrate 14. In the wavelength conversion member 10 of the illustrated example, as shown in FIG. 4, all the wall portions are spaced apart from the second substrate 14 at the upper ends, and a quantum dot-containing region is provided between the wall portion and the second substrate 14. Having such a configuration makes it possible to improve the adhesion between the wavelength conversion layer 16 containing the quantum dots 24 and the second substrate on the upper side, that is, on the opening side of the concave portion 18a of the resin layer 18.

As will be described later, in the manufacture of the wavelength conversion member, as an example, a mold having concavities and convexities corresponding to concave portions and wall portions of the resin layer is filled with a coating liquid that will form a resin layer (composition for forming a resin layer), the first substrate is laminated to cover the coating liquid filled in the mold, the coating liquid that will form a resin layer is cured, and the mold is removed to thereby form a laminate of the first substrate and the resin layer. Next, the concave portions of the resin layer are filled with a polymerizable composition containing quantum dots, the second substrate is laminated on the resin layer to seal the polymerizable composition filled in the resin layer, and then the polymerizable composition is cured to prepare a wavelength conversion member in which a wavelength conversion layer having a resin layer and a quantum dot-containing region is sandwiched between the first substrate and the second substrate.

The first substrate and the resin layer can be laminated with sufficient adhesion since the resin layer is laminated in the state of a coating liquid and then the coating liquid is cured. In addition, the resin layer and the quantum dot-containing region can also be laminated with sufficient adhesion since the concave portions are filled with the polymerizable composition which is then cured. Here, regarding the wavelength conversion layer and the second substrate, the region corresponding to the concave portion of the resin layer which is filled with the polymerizable composition containing quantum dots is filled with a polymerizable composition containing quantum dots in the state of a coating liquid which is then cured, and therefore favorable adhesion can be obtained. Further, the adhesion between the wavelength conversion layer 16 and the second substrate 14 can be increased by a configuration where, in the resin layer 18, the upper end of at least a part of the wall portion constituting the concave portion 18a is spaced apart from the second substrate 14, and the quantum dot-containing regions are present not only in the concave portion 18a but also between the second substrate 14 and the upper end of the wall portion spaced apart from the second substrate 14. In the present invention and the present specification, the phrase "between the second substrate 14 and the upper end of the wall portion spaced apart from the second substrate 14" includes not only a region directly above the wall portion whose upper end is spaced apart from the second substrate 14 but also a region between the second substrate 14 and the concave portion 18a (the upper end portion thereof) adjacent to the wall portion whose upper end is spaced apart from the second substrate 14 in a plane direction.

In the wavelength conversion layer 16, the wall portion of the resin layer 18 spaced apart from the second substrate 14 is not limited to a configuration in which, as shown in FIG. 4, the upper ends of all the wall portions are spaced apart from the second substrate 14 and the quantum dot-containing regions are provided therebetween. A greater number of wall portions of the resin layer 18 spaced apart from the second substrate 14 can lead to higher adhesion between the wavelength conversion layer 16 and the second substrate 14. Considering this point, in the wavelength conversion member 10, it is preferable that the upper end of the wall portion of the portion corresponding to the area of 30% or more of the area of a display unit of a display device in which the wavelength conversion member 10 is used is spaced apart from the second substrate 14, and in the wall portion, it is more preferable that the upper ends of all the wall portions are spaced apart from the second substrate 14, and the quantum dot-containing region and the second substrate 14 are in contact with each other over the entire surface.

Figure 6:
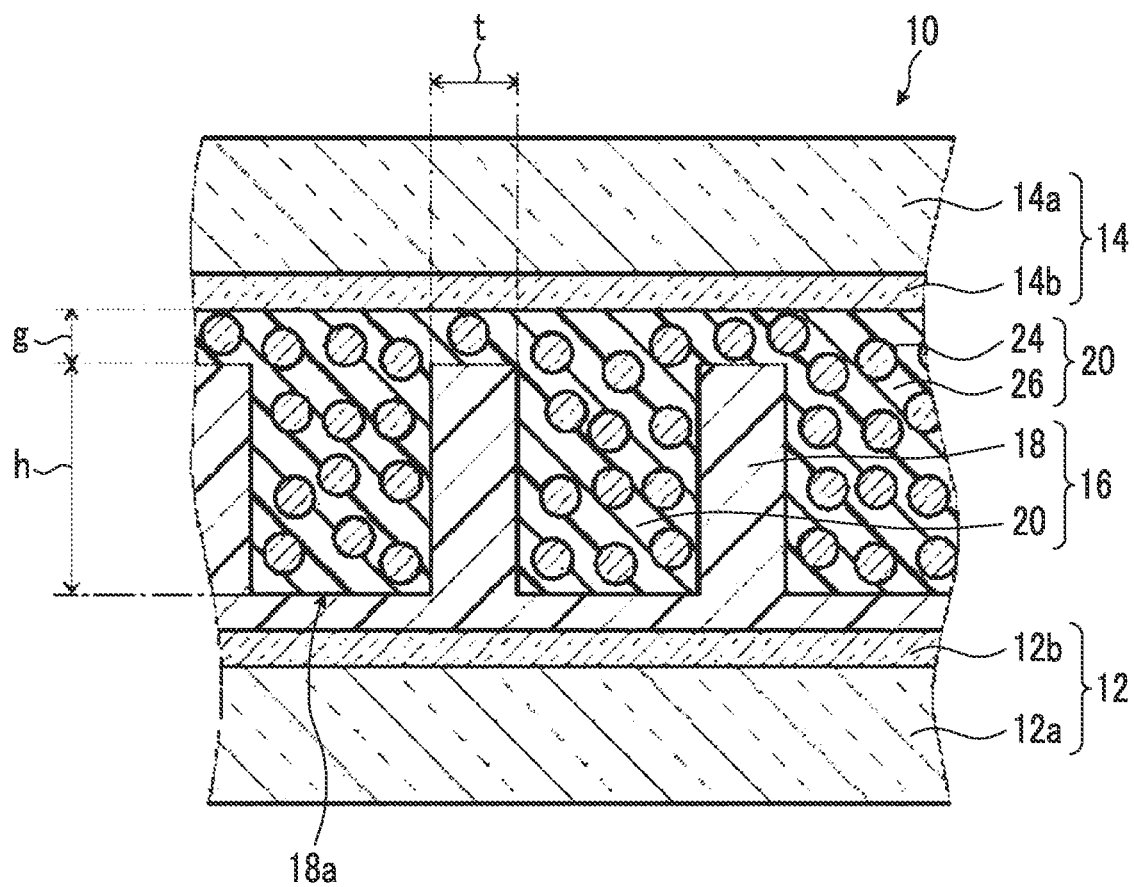
FIG. 6 is a partially enlarged view of FIG. 4.

With regard to the wavelength conversion layer 16, in the wall portion whose upper end is spaced apart from the second substrate, a gap g (shortest distance) between the upper end (uppermost portion) of the wall portion and the second substrate 14 is not particularly limited as long as both are spaced apart from each other (see FIG. 6). Here, the gap g between the upper end of the wall portion and the second substrate 14 is preferably 0.01 to 10 µm, more preferably 0.05 to 4 µm, and still more preferably 0.1 to 4 µm. The gap g between the upper end of the wall portion and the second substrate 14 may be obtained, for example, by cutting a portion of the wall portion of the wavelength conversion member 10 with a microtome or the like to form a cross section, and observing the section with a scanning electron microscope (SEM) or the like. The "portion of the wall portion of the wavelength conversion member 10" is "a portion of the wavelength conversion member 10 that is not the concave portion 18a". The gap g can be obtained as an arithmetic average of the measured values at 10 randomly selected locations.

In the wavelength conversion layer 16, a depth h of the concave portion 18a of the resin layer 18 and a distance t between the adjacent quantum dot-containing regions (the quantum dot-containing regions in the adjacent concave portions 18a) are not particularly limited. The depth h of the concave portion of the resin layer 18 is preferably a depth that allows the thickness of the quantum dot-containing region from the bottom of the concave portion 18a to the second substrate 14 (that is, "depth h+gap g") to be 1 to 100 µm. In addition, the distance t between the adjacent quantum dot-containing regions is preferably 5 to 300 µm.

The thickness (which can also be referred to as height) of the quantum dot-containing region is preferably 1 µm or more from the viewpoint of easiness of reaching the target chromaticity. On the other hand, in a case where the quantum dot-containing region becomes thicker, the amount of light absorbed by the quantum dot-containing region increases. Considering these points, the thickness of the quantum dot-containing region from the bottom of the concave portion 18a to the second substrate 14 is preferably 1 to 100 µm, more preferably 5 to 80 µm, and still more preferably 10 to 50 µm. The depth h of the concave portion 18a formed in the resin layer 18 and the thickness of the quantum dot-containing region from the bottom of the concave portion 18a to the second substrate 14 may be obtained by cutting a portion of the concave portion 18a of the wavelength conversion member with a microtome or the like to form a cross section, and observing the cross section with a confocal laser microscope or the like in a state where the wavelength conversion layer 16 is irradiated with excitation light to cause the quantum dots to emit light. For the depth h and the thickness of the quantum dot-containing region, an arithmetic average of the measured values of 10 randomly selected quantum dot-containing regions can be adopted.

In addition, the distance t between the adjacent quantum dot-containing regions, that is, the thickness of the wall portion of the resin layer 18 between the adjacent quantum dot-containing regions (between the adjacent concave portions 18a) is preferably short (thin wall portion) in order to make the resin layer 18 invisible. On the other hand, from the viewpoint of strength and durability, the distance t between the adjacent quantum dot-containing regions is preferably a value equal to or greater than a certain value. From these viewpoints, the distance t between the adjacent quantum dot-containing regions is preferably 5 to 300 µm, more preferably 10 to 200 µm, and still more preferably 15 to 100 am. The distance t between the adjacent quantum dot-containing regions is the shortest distance between the adjacent quantum dot-containing regions. This distance t can be obtained by observing the surface from one surface of the wavelength conversion member 10 using a confocal laser microscope or the like, in a state where the wavelength conversion layer 16 is irradiated with excitation light to cause the quantum dots to emit light, and measuring the thickness of the wall portion of the resin layer 18 between the adjacent quantum dot-containing regions. In addition, an arithmetic average of the distances of 20 randomly selected locations can be adopted as the distance t between the adjacent quantum dot-containing regions.

The shape, size, arrangement pattern, and the like of the quantum dot-containing region are not particularly limited and may be appropriately designed. In the design, it is possible to consider the geometrical constraint for arranging the quantum dot-containing regions spaced apart from each other in a plan view, the allowable value of the width of the non-light emitting region generated at the time of cutting, and the like. In addition, for example, in a case where a printing method is used as one of methods for forming a quantum dot-containing region as will be described later, it is preferable that each occupied area is equal to or larger than a certain size from the viewpoint of ease of printing. The occupied area at this time is an occupied area in a plan view. Further, from the viewpoint of improving the mechanical strength of the wavelength conversion member, it is preferable that the shortest distance between the adjacent quantum dot-containing regions, that is, the thickness of the wall portion is large. The shape, size, and arrangement pattern of the quantum dot-containing region may be designed in consideration of these points.

The ratio of a volume Vp of the quantum dot-containing region to a volume Vb of the resin layer 18 can be any ratio. In one embodiment, for the ratio "Vp/(Vp+Vb)", $0.1 \leq Vp/(Vp+Vb) < 0.9$ is preferable, $0.2 \leq Vp/(Vp+Vb) < 0.85$ is more preferable, and $0.3 \leq Vp/(Vp+Vb) < 0.8$ is still more preferable. Here, the volume Vp of the quantum dot-containing region and the volume Vb of the resin layer 18 are defined as the products of the respective areas and thicknesses in a case of observing from a direction orthogonal to the main surface of the wavelength conversion member 10.

The wavelength conversion layer 16 can have a configuration in which the resin layer 18 and the wavelength conversion layer 16 having a quantum dot-containing region are sandwiched between the first substrate 12 and the second substrate 14.

Figure 7:
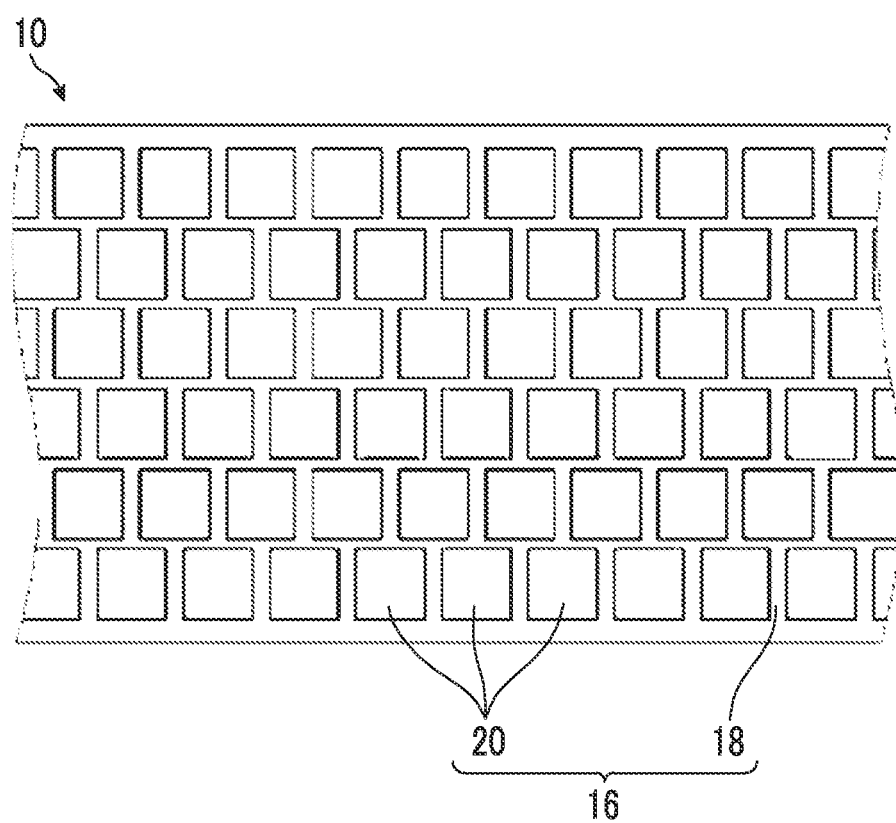
FIG. 7 is a plan view showing an example of a pattern of a quantum dot-containing region.
Figure 8:
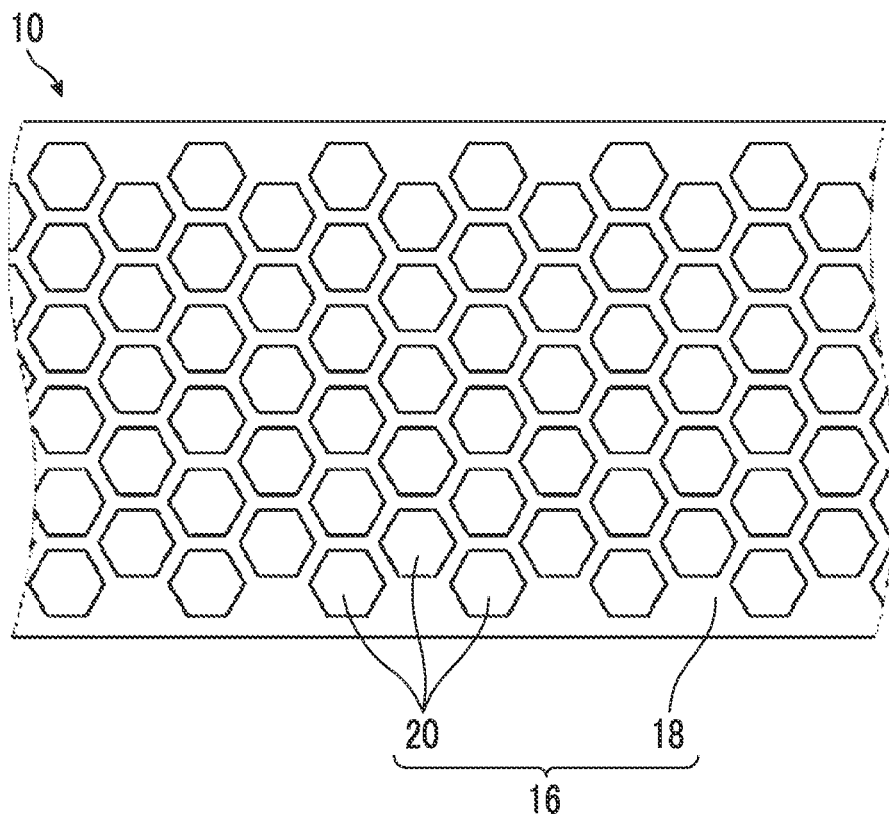
FIG. 8 is a plan view showing another example of the pattern of the quantum dot-containing region.

In the wavelength conversion member 10 shown in FIG. 2 to FIG. 4, the quantum dot-containing region (concave portion 18a) is cylindrical and is circular in a plan view. In this regard, the shape of the quantum dot-containing region is not particularly limited. For example, the quantum dot-containing region may be a polygonal prism, such as a quadrangle in a plan view as shown in FIG. 7, or a hexagon (honeycomb structure) in a plan view as shown in FIG. 8, or may be a regular polygonal prism. In addition, in the above-mentioned example, the bottom surface of the cylinder or polygonal prism is arranged parallel to the substrate surface. In this regard, the bottom surface does not necessarily have to be arranged parallel to the substrate surface. In addition, the shape of each quantum dot-containing region may be irregular.

Figure 9:
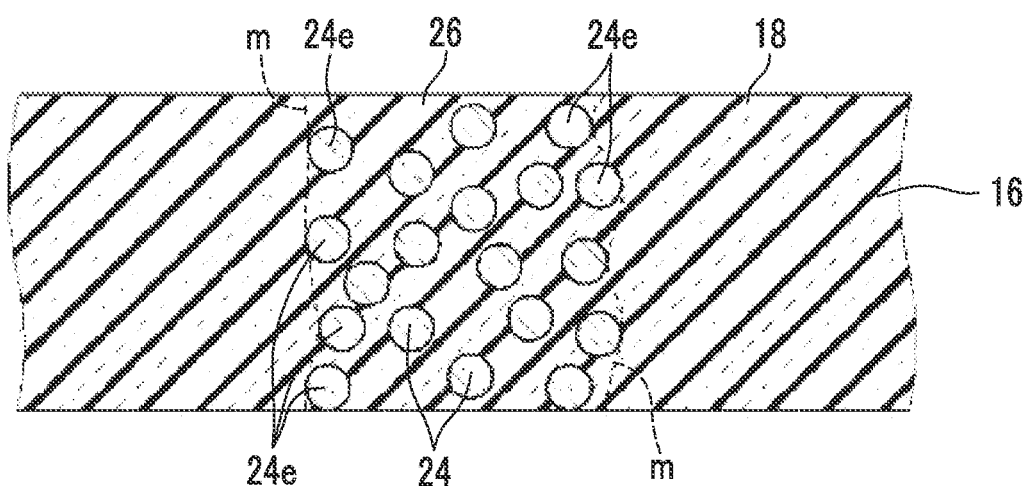
FIG. 9 is a conceptual diagram for illustrating a method of specifying a contour of the quantum dot-containing region.

In a case where the boundary between the matrix 26 of the quantum dot-containing region and the resin layer 18 is not clear, a line connecting points outside (side where the quantum dots 24 are not arranged) the quantum dots 24*e* located in the outermost portion of the region where the quantum dots 24 are arranged close to each other is regarded as a contour m of the quantum dot-containing region (boundary between the quantum dot-containing region and the resin layer 18), as shown in FIG. 9. The position of the quantum dot can be specified by irradiation of the wavelength conversion layer with excitation light to cause the quantum dots to emit light and observation with, for example, a confocal laser microscope, whereby the contour m of the quantum dot-containing region can be specified. In the present invention and the present specification, with respect to the sides of a cylinder, a polygonal prism, or the like, a meandering shape such as the contour of FIG. 9 is also allowed. In addition, in the above-described form, the quantum dot-containing regions are periodically arranged in a pattern. In this regard, as long as a plurality of quantum dot-containing regions are discretely arranged, the arrangement of the quantum dot-containing regions may be aperiodic as long as the desired performance is not impaired. It is preferable that the quantum dot-containing regions are uniformly distributed over the entire wavelength conversion layer 16 because the in-plane distribution of brightness is uniform.

In order to make an amount of fluorescence sufficient, it is preferable that the region occupied by the quantum dot-containing region is large. The quantum dots 24 in the quantum dot-containing region may be one type or a plurality of types. In addition, the quantum dots 24 in one quantum dot-containing region are one type, and among a plurality of quantum dot-containing regions, a region containing first quantum dots and a region containing second quantum dots different from the first quantum dots may be arranged periodically or aperiodically. The number of types of quantum dots may be three or more. The details of the quantum dots are as described above.

As described above, the wavelength conversion layer is not particularly limited in the shape of the quantum dot-containing region, the arrangement pattern of the quantum dot-containing regions, and the like. In any case, the quantum dot-containing regions are discretely arranged on the film surface, and therefore the quantum dots in the quantum dot-containing region at the cut end portion may deteriorate. However, since the quantum dots in the portion other than the cut end portion are surrounded and sealed by the resin in the direction along the film surface, it is possible to suppress the deterioration of the performance due to the invasion of oxygen from the direction along the film surface.

As described above, the wavelength conversion member 10 shown in FIG. 2 to FIG. 4 has a configuration in which the wavelength conversion layer 16 is laminated on one surface of the first substrate 12, and the second substrate 14 is further laminated on the wavelength conversion layer 16, so that the wavelength conversion layer 16 is sandwiched between the two substrates.

The resin layer 18 can be formed, for example, by preparing a composition for forming a resin layer containing one or more polymerizable compounds, applying the composition, and curing the composition.

The desired shortest distance between the quantum dot-containing regions, that is, the desired distance t between the quantum dot-containing regions (concave portions 18*a*) varies depending on the composition of the resin layer 18. The shortest distance between the adjacent quantum dot-containing regions of the resin layer 18 means the shortest distance in the film surface between the adjacent quantum dot-containing regions in a case of observing from the main surface of the wavelength conversion member.

For the composition for forming a resin layer (polymerizable composition), reference can be made to paragraphs [0174] to [0179] of WO2018/186300.

An example of the manufacturing process of the wavelength conversion member will be described with reference to the conceptual diagram of FIG. 10.

First, a composition L1 for forming a resin layer for forming the resin layer 18 is prepared by mixing various components such as a polymerization initiator, inorganic particles, and light scattering particles, if necessary, in addition to the polymerizable compound.

In addition, the above-mentioned polymerizable composition L2 containing quantum dots is prepared.

Further, a mold M having a concave-convex pattern corresponding to the concave portion 18*a* and the wall portion of the resin layer 18 for forming the resin layer 18, and the first substrate 12 and the second substrate 14 are prepared.

Figure 10:
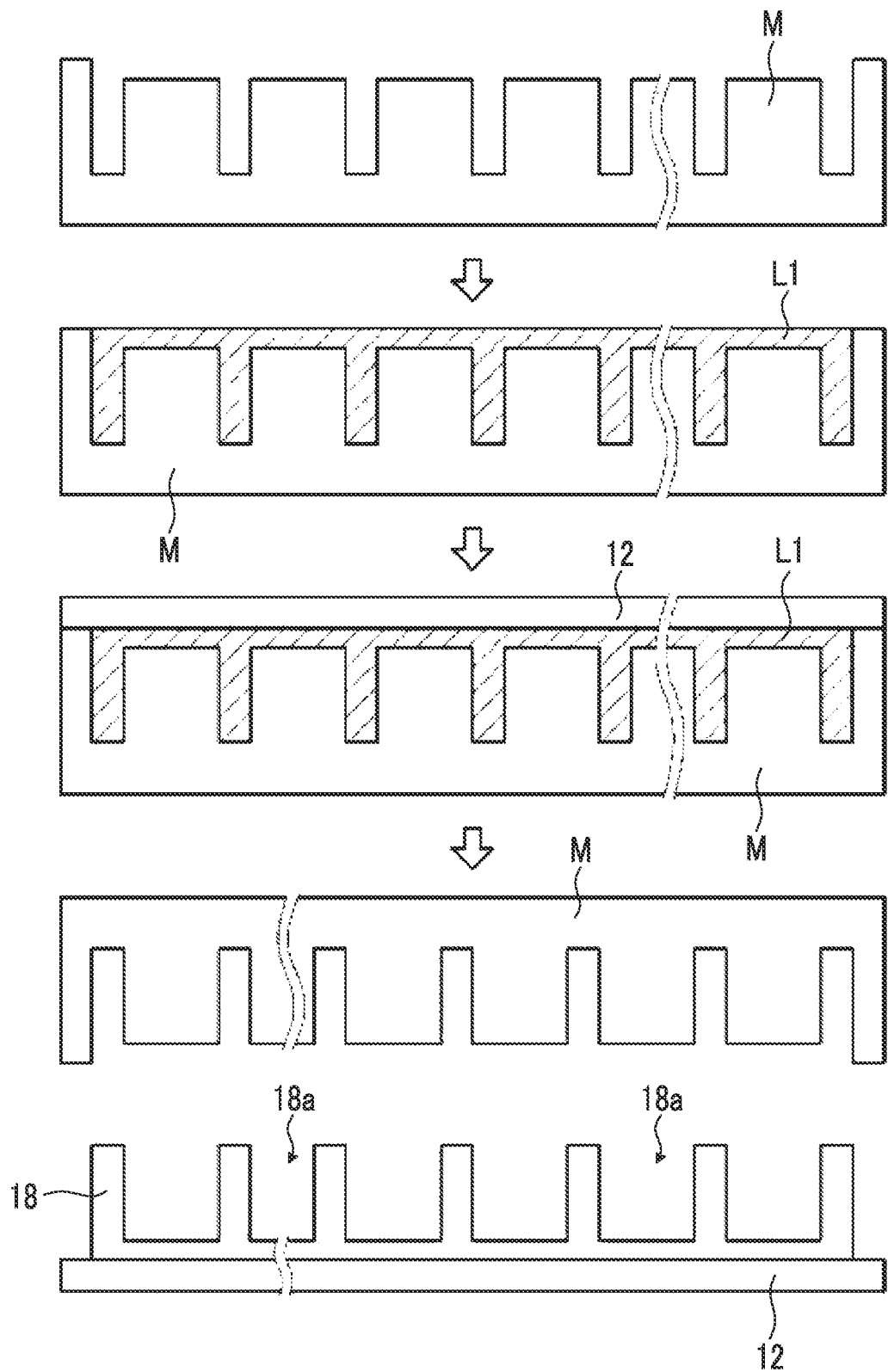
FIG. 10 is a conceptual diagram for illustrating an example of a method for manufacturing a wavelength conversion member.

After preparing these, first, as shown in the first and second stages of FIG. 10, the prepared mold M is filled with the prepared composition L1 for forming a resin layer, and as shown in the third stage of FIG. 10, the first substrate 12 is laminated on the mold M to cover the entire surface of the composition L1 for forming a resin layer.

Next, the composition L1 for forming a resin layer is cured by, for example, irradiation with ultraviolet rays to form the resin layer 18, and as shown in the fourth stage of FIG. 10, the mold M is removed from the resin layer 18. As a result, a laminate is formed in which the resin layer 18 with the bottom of the concave portion 18*a* facing the first substrate 12 is laminated on one surface of the first substrate 12.

In the wavelength conversion layer, the method for forming the concave portion 18*a* of the resin layer 18 is not limited to the method shown in FIG. 10, and various known methods for forming a sheet-like material having concavities and convexities can be used. For example, there is a method in which the composition L1 for forming a resin layer is first applied to the first substrate 12, the mold M is pressed against the composition L1 for forming a resin layer, and then the composition L1 for forming a resin layer is cured, or a method in which the first substrate 12 and the mold M are laminated, the composition L1 for forming a resin layer is filled between the first substrate 12 and the mold M, and then the composition L1 for forming a resin layer is cured. In addition to these methods, a method of forming a planar resin layer and then etching the resin layer to form the resin layer 18 having the concave portion 18*a*, a method of forming the resin layer 18 having the concave portion 18*a* using a printing method such as an ink jet method or a dispenser method, and the like can also be used.

<Substrate>

The wavelength conversion member has the wavelength conversion layer between two substrates. Of these two substrates, only one substrate can include a barrier layer or both substrates can include a barrier layer, and it is preferable that both substrates include a barrier layer. The two substrates may be the same substrate or may be substrates having different layer configurations and/or constituent components. It is preferable that the substrate having a barrier layer includes at least a barrier layer and includes a support from the viewpoint of durability of the substrate or the like. The lamination order is preferably "support/barrier layer/wavelength conversion layer". Here, "/" is used to include both that the part described on the left and the part described on the right are in direct contact with each other and that there are one or more other layers therebetween. For example, the support and the barrier layer may be in direct contact with each other, or one or more organic layers may be present between the support and the barrier layer. In addition, for example, the barrier layer and the wavelength conversion layer may be in direct contact with each other, or one or more organic layers may be present between the barrier layer and the wavelength conversion layer.

(Barrier Layer)

The barrier layer is a layer containing at least one inorganic substance, and is preferably an inorganic layer. In the present invention and the present specification, the "inorganic layer" is a layer containing an inorganic substance as a main component. The main component refers to a component that accounts for the largest amount on a mass basis among the components constituting the layer. The inorganic layer can be a layer in which the content of the inorganic substance is 50% by mass or more, 60% by mass or more, 70% by mass or more, 80% by mass or more, 90% by mass or more, 95% by mass or more, or 99% by mass or more. Alternatively, the inorganic layer can be a layer composed of only an inorganic substance. Here, the layer composed of only an inorganic substance refers to a layer containing only an inorganic substance, excluding impurities inevitably incorporated in the manufacturing process. In the inorganic layer, only one type of the inorganic substance may be contained, or two or more types of the inorganic substances may be contained.

Examples of the inorganic substance constituting the inorganic layer include a metal and various inorganic compounds such as an inorganic oxide, a nitride, and a nitride oxide. Silicon, aluminum, magnesium, titanium, tin, indium, and cerium are preferable as the element constituting the inorganic substance, and one type or two or more types of these elements may be contained. Specific examples of the inorganic substance include a silicon oxide, an aluminum oxide, a magnesium oxide, a titanium oxide, a tin oxide, an indium oxide alloy, a silicon oxynitride, a silicon nitride, an aluminum nitride, and a titanium nitride. In addition, a metal film, for example, an aluminum film, a silver film, a tin film, a chromium film, a nickel film, or a titanium film may be provided as the inorganic layer.

Among the above-mentioned inorganic substances, a silicon oxide and an aluminum oxide are preferable. In addition, it does not matter whether the oxide has a composition having a stoichiometric ratio or a composition having a non-stoichiometric ratio. This point also applies to a nitride.

The method for forming the barrier layer is not particularly limited, and for example, various film forming methods can be used that can evaporate and/or scatter a film forming material to be deposited on the surface on which the barrier layer is to be formed. Examples thereof include physical vapor deposition methods such as a vacuum vapor deposition method in which an inorganic material is heated and vapor-deposited; an oxidation reaction vapor deposition method in which an inorganic material is used as a raw material and is oxidized and vapor-deposited by introducing an oxygen gas; a sputtering method in which an inorganic material is used as a target raw material, argon gas and/or oxygen gas is introduced, and sputtering is carried out to perform vapor deposition; and an ion plating method in which an inorganic material is heated by a plasma beam generated by a plasma gun to be vapor-deposited; and a plasma chemical vapor deposition method using an organic silicon compound as a raw material, as a method for forming a vapor-deposited film of a silicon oxide.

Thickness of Barrier Layer

From the viewpoint of barrier properties, the thickness of the barrier layer is preferably 0.03 μm or more, more preferably 0.05 μm or more, still more preferably 0.10 μm or more, and even still more preferably 0.15 μm or more. In addition, from the viewpoint of reducing the thickness of the wavelength conversion member, the thickness of the barrier layer is preferably 0.60 μm or less, more preferably 0.55 μm or less, still more preferably 0.50 μm or less, and even still more preferably 0.45 μm or less.

Elastic Modulus of Barrier Layer

The elastic modulus of the barrier layer is not particularly limited. It is preferable to form a barrier layer having an elastic modulus such that the above-described expression is satisfied from the viewpoint of controlling the rub resistance of the wavelength conversion member. The elastic modulus of the barrier layer can be controlled, for example, by a type of a component for forming the barrier layer. In addition, in a case where the thickness of the barrier layer is increased, the value of the elastic modulus of the barrier layer tends to increase. In one embodiment, the elastic modulus of the barrier layer can be 5.0 GPa or more, 7.0 GPa or more, or 9.0 GPa or more. In addition, in one embodiment, the elastic modulus of the barrier layer can be 30.0 GPa or less, 25.0 GPa or less, or 20.0 GPa or less.

The barrier layer is preferably a layer having gas barrier properties that block oxygen. Specifically, the oxygen permeability of the barrier layer is preferably 1 $cc/(m^2 \cdot day \cdot atm)$ or less. The SI unit of the oxygen permeability is [fm/(s·Pa)]. The "fm" is a femtometer. 1 fm=$1 \times 10^{-15}$ μm. The unit "$cc/(m^2 \cdot day \cdot atm)$" can be converted into the SI unit by the conversion formula "1 fm/(s·Pa)=8.752 $cc/(m^2 \cdot day \cdot atm)$". In addition, in the present invention and the present specification, the oxygen permeability is a value measured using an oxygen gas permeability measuring device (OX-TRAN 2/20, manufactured by MOCON, Inc.) under the conditions of a measurement temperature of 23° C. and a relative humidity of 90%. The barrier layer also preferably has water vapor barrier properties that block water vapor.

(Support)

A strip-shaped support film having flexibility and being transparent to visible light is preferable as the support of the substrate. Here, the phrase "transparent to visible light" refers to that the light transmittance in the visible light range is 80% or more and preferably 85% or more. The light transmittance used as a measure of transparency can be calculated by measuring the total light transmittance and the amount of scattered light using the method described in JIS K 7105, that is, an integrating sphere type light transmittance measuring device, and subtracting the diffuse transmittance from the total light transmittance. For the support film having flexibility, reference can be made to paragraphs [0046] to [0052] of JP2007-290369A and paragraphs [0040] to [0055] of JP2005-096108A.

Specific examples of the support film include a polyester film such as polyethylene terephthalate (PET), a film consisting of a polymer having a cyclic olefin structure, and a polystyrene film.

Thickness of Support

From the viewpoint of improving the impact resistance of the wavelength conversion member, the thickness of the support is preferably in a range of 6 to 75 µm, more preferably in a range of 9 to 50 µm, and still more preferably in a range of 10 to 40 µm. In a form in which the retroreflection of light is increased, such as in a case where the concentration of quantum dots contained in the wavelength conversion layer is reduced and in a case where the thickness of the wavelength conversion layer is reduced, it is more preferable that the absorbance of light having a wavelength of 450 nm is lower. From this point of view, the thickness of the support is preferably 30 µm or less and more preferably 20 µm or less. In one embodiment, the thickness of the support is preferably in a range of 10 to 30 µm.

Elastic Modulus of Support

The elastic modulus of the support is not particularly limited. From the viewpoint of the transportability of the substrate, the elastic modulus of the support is preferably 1.0 GPa or more, more preferably 2.0 GPa or more, and still more preferably 3.0 GPa or more. In addition, from the viewpoint of the above-described detectability, the elastic modulus of the support is preferably 8.0 GPa or less, more preferably 7.0 GPa or less, and still more preferably 6.0 GPa or less.

(Organic Layer)

The substrate may be composed of only the support and the barrier layer, or may have one or more layers in addition to the support and the barrier layer. For example, in the wavelength conversion member 10 of the illustrated example, the barrier layer 12b of the first substrate 12 (and the barrier layer 14b of the second substrate 14) has, as shown in the partially enlarged view A of FIG. 4, a configuration in which three layers of an underlying organic layer 34 formed on the surface of the support film 12a (the support film 14a), a barrier layer 36 formed on the underlying organic layer 34, and a protective organic layer 38 formed on the barrier layer 36 are laminated.

In the present invention and the present specification, the "organic layer" is a layer containing an organic substance as a main component. The organic layer can be a layer in which the content of the organic substance is 50% by mass or more, 60% by mass or more, 70% by mass or more, 80% by mass or more, 90% by mass or more, 95% by mass or more, or 99% by mass or more. Alternatively, the organic layer can be a layer composed of only an organic substance. Here, the layer composed of only an organic substance refers to a layer containing only an organic substance, excluding impurities inevitably incorporated in the manufacturing process. In the organic layer, only one type of the organic substance may be contained, or two or more types of the organic substances may be contained.

The surface of the support film 12a, that is, the underlying organic layer 34 under the barrier layer 36 is an underlayer (undercoat layer) for properly forming the barrier layer 36.

The protective organic layer 38 formed on the surface of the barrier layer 36 is a protective layer (overcoat layer) that protects the barrier layer 36 that mainly exhibits the barrier properties. In addition, it can also be a layer for increasing the adhesion between the barrier layer and the wavelength conversion layer.

For the organic layer, reference can be made to paragraphs [0020] to [0042] of JP2007-290369A and paragraphs [0074] to [0105] of JP2005-096108A. In one embodiment, the organic layer can contain a cardo polymer. This leads to an increase in the adhesion between the organic layer and the adjacent layer, particularly the adhesion with the inorganic layer, which is preferable. For details of the cardo polymer, reference can be made to paragraphs [0085] to [0095] of JP2005-096108A.

In addition, an organic layer containing a (meth)acrylamide compound is also preferable as the organic layer. It is preferable that the organic layer containing a (meth)acrylamide compound is provided between the barrier layer and the wavelength conversion layer from the viewpoint of increasing the adhesion between these layers. In the present invention and the present specification, the "(meth)acrylamide compound" refers to a compound containing one or more (meth)acrylamide groups in one molecule. The "(meth)acrylamide group" is used to indicate one or both of an acrylamide group and a methacrylamide group. The acrylamide group is a monovalent group represented by "$CH_2=CH-(C=O)-NH-$", and the methacrylamide group is a monovalent group represented by $CH_2=C(CH_3)-(C=O)-NH-$". The functionality in the "(meth)acrylamide compound" refers to the number of (meth)acrylamide groups contained in one molecule of this compound. With regard to the (meth)acrylamide compound, the "monofunctional" refers to that the number of (meth)acrylamide groups contained in one molecule is one, and the "polyfunctional" refers to that the number of (meth)acrylamide groups contained in one molecule is two or more. The (meth)acrylamide compound is preferably a polyfunctional (meth)acrylamide compound. For specific examples of the (meth)acrylamide compound, reference can be made to, for example, paragraphs [0069] and [0070] of WO2019/004431A.

The organic layer containing a (meth)acrylamide compound can be formed by using a polymerizable composition containing a (meth)acrylamide compound. The (meth)acrylamide compound is a polymerizable compound, and the polymerizable composition can contain one or more (meth) acrylamide compounds as the polymerizable compound. A known polymerization initiator can be contained in the polymerizable composition. The polymerization initiator is not particularly limited, and reference can be made to, for example, paragraph [0079] of WO2019/004431A.

In addition, an organic layer containing a compound having an alicyclic structure is also preferable as the organic layer. A cyclic polyolefin resin such as a cycloolefin copolymer (COC) or a cycloolefin polymer (COP), or a monomer having an aliphatic ring structure (particularly preferably a (meth)acrylate monomer) is preferably used as the compound having an alicyclic structure. Specifically, the polymers and monomers described in each of JP6086607B, JP6086629B, JP6329880B, JP5914440B, JP5970508B, and JP6675291B are preferable. In order to improve the barrier properties of the organic layer, it is also preferable to mix a hydrophobic compound such as rosin described in each of JP6086607B, JP6053729B, and JP6412813B and/or flat plate-like inorganic particles described in JP6475109B. Further, it is also preferable to mix the polyurethane described in JP6086607B from the viewpoint of improving brittleness. In addition, in order to achieve both adhesiveness and barrier properties, it is also preferable to use a cyclic polyolefin resin and a monomer having an aliphatic ring structure (particularly preferably a (meth)acrylate monomer) in combination.

Specific examples of commercially available products of the compound having an alicyclic structure include ARTON (manufactured by JSR Corporation), ZEONOR (manufactured by Zeon Corporation), APEL (manufactured by Mitsui Chemicals, Inc.), and TOPAS (manufactured by Polyplastics Co., Ltd.) which are cyclic polyolefin resins; and A-DCP: tricyclodecanedimethanol diacrylate (manufactured by Shin-Nakamura Chemical Co., Ltd.), DCP: tricyclodecanedimethanol dimethacrylate (manufactured by Shin-Nakamura Chemical Co., Ltd.), AA-BPEF: 9,9-bis[4-(2-acryloyloxyethoxy)phenyl]fluorene (manufactured by Shin-Nakamura Chemical Co., Ltd.), and ADDA: 1,3-adamantane diacrylate (manufactured by Mitsubishi Gas Chemical Company, Inc.) which are monomers having an aliphatic ring structure.

The organic layer can be formed on the surface of the barrier layer, on the surface of the support, or on the surface of the wavelength conversion layer by a method known as a film forming method using a polymerizable composition. The thickness of the organic layer is preferably in a range of 1 to 10 μm.

From the viewpoint of improving the impact resistance of the wavelength conversion member, the thickness of the substrate having a barrier layer is preferably in a range of 6 to 75 μm, more preferably in a range of 9 to 50 μm, and still more preferably in a range of 10 to 40 μm. In a form in which the retroreflection of light is increased, such as in a case where the concentration of quantum dots contained in the wavelength conversion layer is reduced and in a case where the thickness of the wavelength conversion layer is reduced, it is more preferable that the absorbance of light having a wavelength of 450 nm is lower. From this point of view, the thickness of the substrate having a barrier layer is preferably 30 μm or less and more preferably 20 μm or less. In one embodiment, the thickness of the substrate having a barrier layer is preferably in a range of 10 to 30 μm.

The substrate having a barrier layer preferably has a total light transmittance of 80% or more and more preferably 85% or more in the visible light range. The visible light range is a wavelength range of 380 to 780 nm, and the total light transmittance indicates an arithmetic average of the light transmittance over the visible light range.

The oxygen permeability of the substrate having a barrier layer is preferably 1 cc/(m$^2$·atm) or less. The oxygen permeability of the substrate having a barrier layer is more preferably 0.1 cc/(m$^2$·day·atm) or less, still more preferably 0.01 cc/(m$^2$·day·atm) or less, and even still more preferably 0.001 cc/(m$^2$·day·atm) or less. The substrate having a barrier layer also preferably has water vapor barrier properties that block water vapor.

In a case where one substrate of the two substrates included in the wavelength conversion member does not have a barrier layer, then reference can be made to the above description of the substrate for such a substrate, except that the substrate does not have a barrier layer.

The wavelength conversion member can be, for example, a film-like member.

[Light Emitting Device]

One aspect of the present invention relates to a light emitting device including the wavelength conversion member and a light source.

In one embodiment, the light emitting device can be a backlight unit. The backlight unit can serve, for example, as a light emitting device of a liquid crystal display device.

Figure 11:
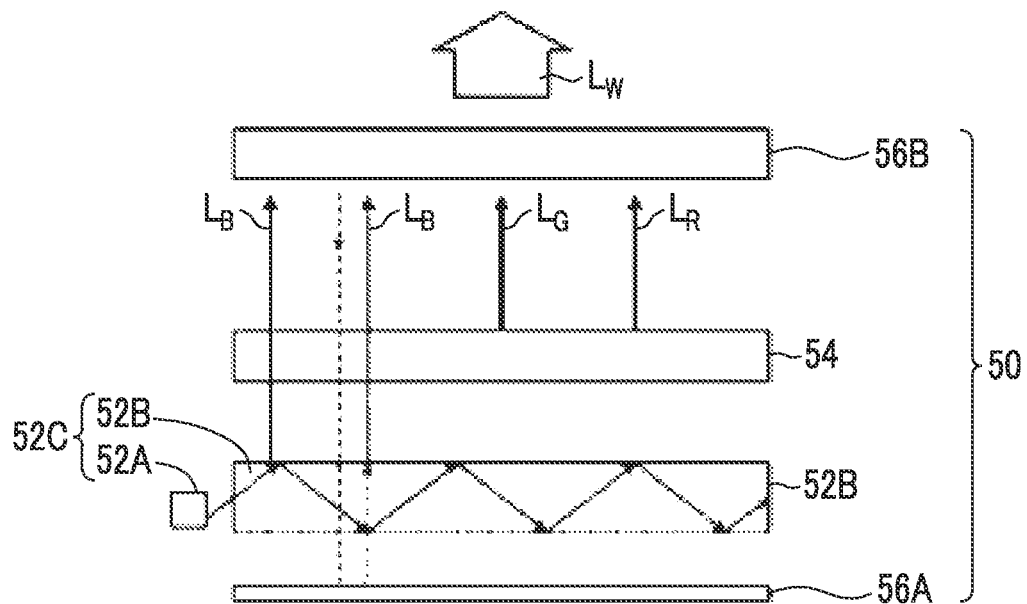
FIG. 11 is a diagram conceptually showing a configuration of an example of a backlight unit.

Hereinafter, an example of the backlight unit will be described with reference to the accompanying drawings. FIG. 11 is a schematic diagram showing a schematic configuration of the backlight unit.

As shown in FIG. 11, a backlight unit 50 includes a planar light source 52C consisting of a light source 52A that emits primary light (blue light $L_B$) and a light guide plate 52B that guides and emits the primary light emitted from the light source 52A, a wavelength conversion member 54 arranged on the planar light source 52C, a reflecting plate 56A arranged opposite to the wavelength conversion member 54 with the planar light source 52C interposed therebetween, and a retroreflective member 56B. In FIG. 11, the reflecting plate 56A, the light guide plate 52B, the wavelength conversion member 54, and the retroreflective member 56B are spaced apart from one another, but in reality these members may be formed in intimate attachment with one another.

The wavelength conversion member 54 emits fluorescence by using at least a part of primary light $L_B$ emitted from the planar light source 52C as excitation light and emits secondary light (green light $L_G$ and red light $L_R$) consisting of the fluorescence and primary light $L_B$ passed through the wavelength conversion member 54. For example, the wavelength conversion member 54 is a wavelength conversion member which is configured such that a wavelength conversion layer containing the quantum dots that emit the green light $L_G$ and the quantum dots that emit the red light $L_R$ upon irradiation with the blue light $L_B$ is sandwiched between two substrates.

In FIG. 11, $L_B$, $L_G$, and $L_R$ emitted from the wavelength conversion member 54 are incident on the retroreflective member 56B, and each incident light repeats reflection between the retroreflective member 56B and the reflecting plate 56A and can pass through the wavelength conversion member 54 many times. As a result, in the wavelength conversion member 54, a sufficient amount of excitation light (blue light $L_B$) is absorbed by quantum dots 24 in the wavelength conversion layer 16 and a sufficient amount of fluorescence ($L_G$ and $L_R$) is emitted, and white light $L_W$ is realized from the retroreflective member 56B and is emitted.

From the viewpoint of realizing high brightness and high color reproducibility, it is preferable to use a backlight unit having a multi-wavelength light source as the backlight unit 50. For example, preferred is a backlight unit which emits blue light having a light emission center wavelength in a wavelength range of 430 to 480 nm and having a luminescence intensity peak with a half-width of 100 nm or less, green light having a light emission center wavelength in a wavelength range of 500 to 600 nm and having a luminescence intensity peak with a half-width of 100 nm or less, and red light having a light emission center wavelength in a wavelength range of 600 to 680 nm and having a luminescence intensity peak with a half-width of 100 nm or less.

From the viewpoint of further improving brightness and color reproducibility, the wavelength range of the blue light emitted from the backlight unit 50 is more preferably 440 to 460 nm.

From the same viewpoint, the wavelength range of the green light emitted from the backlight unit 50 is preferably 520 to 560 nm and more preferably 520 to 545 nm.

In addition, from the same viewpoint, the wavelength range of the red light emitted from the backlight unit 50 is more preferably 610 to 640 nm.

In addition, from the same viewpoint, all the half-widths of the respective luminescence intensities of the blue light, the green light, and the red light emitted from the backlight unit 50 are preferably 80 nm or less, more preferably 50 nm or less, still more preferably 40 nm or less, and particularly preferably 30 nm or less. Above all, the half-width of the luminescence intensity of the blue light is particularly preferably 25 nm or less.

The light source 52A can be, for example, a blue light emitting diode. The blue light emitting diode can emit blue light having a light emission center wavelength in a wavelength range of, for example, 430 to 480 nm. Alternatively, an ultraviolet light emitting diode that emits ultraviolet light may be used as the light source 52A. As the light source 52A, a laser light source or the like can be used in addition to the light emitting diode. In a case where a light source that emits ultraviolet light is provided, the wavelength conversion layer of the wavelength conversion member 54 may contain quantum dots that emit blue light, quantum dots that emit green light, and quantum dots that emit red light, upon irradiation with ultraviolet light.

As shown in FIG. 11, the planar light source 52C may be a planar light source consisting of the light source 52A and the light guide plate 52B that guides and emits the primary light emitted from the light source 52A, or may be a planar light source in which the light source 52A and the wavelength conversion member 54 are arranged parallel to each other on the plane, and a diffusion plate is provided in place of the light guide plate 52B. The former planar light source is generally referred to as an edge light mode, and the latter planar light source is generally referred to as a direct backlight mode. In the above description, a case where a planar light source is used as the light source has been described as an example. In this regard, a light source other than the planar light source can also be used as the light source.

<Configuration of Backlight Unit>

In FIG. 11, an edge light mode backlight unit including a light guide plate, a reflecting plate, and the like as constituent members has been illustrated as the configuration of the backlight unit. In this regard, the configuration of the backlight unit may be a direct backlight mode. A known light guide plate can be used as the light guide plate.

In addition, the reflecting plate 56A is not particularly limited and a known reflecting plate can be used, for which reference can be made to JP3416302B, JP3363565B, JP4091978B, JP3448626B, and the like.

The retroreflective member 56B may be composed of a known diffusion plate, diffusion sheet, prism sheet (for example, BEF series manufactured by Sumitomo 3M Limited), light guide, or the like. For the configuration of the retroreflective member 56B, reference can be made to JP3416302B, JP3363565B, JP4091978B, JP3448626B, and the like.

[Liquid Crystal Display Device]

One aspect of the present invention relates to a liquid crystal display device including the light emitting device and a liquid crystal cell.

Figure 12:
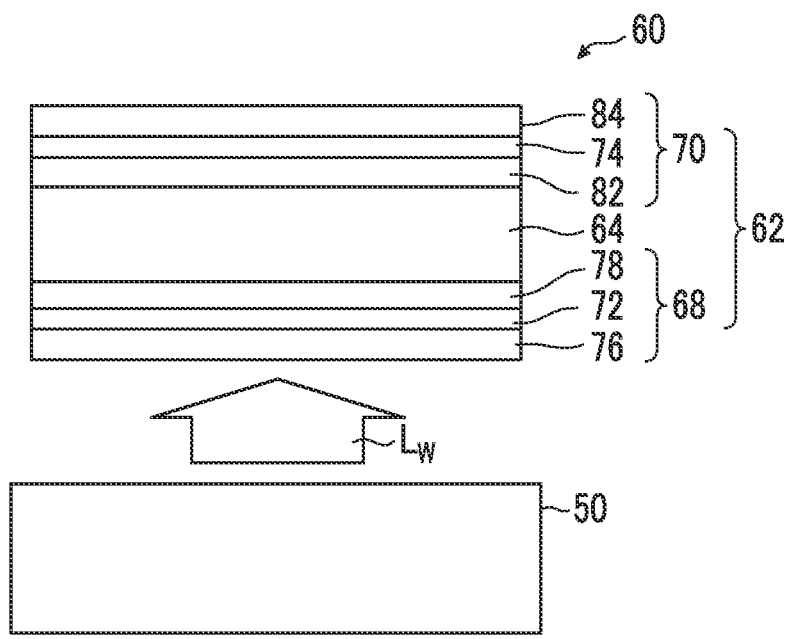
FIG. 12 is a diagram conceptually showing a configuration of an example of a liquid crystal display device.

Hereinafter, an example of the liquid crystal display device will be described with reference to the accompanying drawings. FIG. 12 is a schematic diagram showing a schematic configuration of the liquid crystal display device.

As shown in FIG. 12, a liquid crystal display device 60 includes a backlight unit 50 as a light emitting device and a liquid crystal cell unit 62 arranged opposite to the retroreflective member side of the backlight unit.

As shown in FIG. 12, the liquid crystal cell unit 62 has a configuration in which a liquid crystal cell 64 is sandwiched between a polarizing plate 68 and a polarizing plate 70, in which the polarizing plate 68 and the polarizing plate 70 are each configured such that both main surfaces of each of polarizers 72 and 74 are protected by polarizing plate protective films 76 and 78, and polarizing plate protective films 82 and 84, respectively.

The liquid crystal cell 64, polarizing plates 68 and 70, and constituent elements thereof constituting the liquid crystal display device 60 are not particularly limited, and products prepared by a known method, commercially available products, and the like can be used. In addition, it is of course possible to provide a known interlayer such as an adhesive layer between the layers.

A driving mode of the liquid crystal cell 64 is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode can be used. The liquid crystal cell is preferably of VA mode, OCB mode, IPS mode, or TN mode. However, the core is not limited thereto. An example of the configuration of the liquid crystal display device in the VA mode may be the configuration illustrated in FIG. 2 of JP2008-262161A. In this regard, a specific configuration of the liquid crystal display device is not particularly limited, and a known configuration can be adopted.

The liquid crystal display device 60 can further have an optical compensation member for carrying out optical compensation, or an accompanying functional layer such as an adhesive layer, if necessary. In addition, in the liquid crystal display device 60, a surface layer such as a forward scattering layer, a primer layer, an antistatic layer, or an undercoat layer may be arranged together with (or instead of) a color filter substrate, a thin layer transistor substrate, a lens film, a diffusion sheet, a hard coat layer, an antireflection layer, a low reflective layer, an antiglare layer, and the like.

The polarizing plate 68 on the backlight unit 50 side may have a phase difference film as the polarizing plate protective film 78 on the liquid crystal cell 64 side. A known cellulose acylate film or the like can be used as such a phase difference film.

EXAMPLES

Hereinafter, the present invention will be described in more detail based on Examples. The materials, the amounts of materials used, the proportions, the treatment details, the treatment procedure, and the like shown in the Examples below may be appropriately modified without departing from the spirit of the present invention. Therefore, the scope of the present invention should not be construed as being limited by the specific examples described below.

Example 1

<First Substrate and Second Substrate>

LUMIRROR S10-#12 (manufactured by Toray Industries, Inc.) was used as a support, and $SiO_2$ was vapor-deposited under vacuum on one surface of the support to form a barrier layer (inorganic substance: see Table 1). The resulting structure was used as a first substrate and a second substrate.

<Preparation of Wavelength Conversion Layer>

The following quantum dot-containing polymerizable composition 1 was prepared, filtered through a polypropylene filter having a pore diameter of 50 μm, dried under reduced pressure for 60 minutes, and used as a coating liquid.

| Quantum dot-containing polymerizable composition 1 | |
| --- | --- |
| Toluene dispersion liquid of quantum dots 1 (emission maximum: 530 nm) | 7 parts by mass |

-continued

| Quantum dot-containing polymerizable composition 1 | |
| --- | --- |
| Toluene dispersion liquid of quantum dots 2 (emission maximum: 620 nm) | 3 part by mass |
| Isobornyl acrylate (IBXA, manufactured by Osaka Organic Chemical Industry Ltd.) | 2.4 parts by mass |
| Trimethylolpropane triacrylate (A-TMPT, manufactured by Shin-Nakamura Chemical Co., Ltd.) | 0.54 parts by mass |
| Photopolymerization initiator (IRGACURE 819, manufactured by BASF SE) | 0.009 parts by mass |
| Light-scattering particles (TOSPEARL 120, manufactured by Momentive Performance Materials Inc.) | 1 part by mass |

The following nanocrystals having a core-shell structure (core: InP/shell: ZnS) were used as quantum dots 1 and 2. In the toluene dispersion liquid of the quantum dots 1 and the toluene dispersion liquid of the quantum dots 2, the quantum dot concentration is 1% by mass.

Quantum dots 1: INP 530-10 (manufactured by NN-Labs, LLC): fluorescence half-width: 65 nm Quantum dots 2: INP 620-10 (manufactured by NN-Labs, LLC): fluorescence half-width: 70 nm The previously prepared substrate was used as the first substrate, and the quantum dot-containing polymerizable composition 1 was applied onto the surface of the barrier layer of the first substrate to form a coating layer.

Next, the coating layer was partially cured by irradiation with ultraviolet rays using an air-cooled metal halide lamp (manufactured by Eye Graphics Co., Ltd.) at an irradiation intensity of 160 W/cm$^2$ while purging with nitrogen.

Next, a second substrate was laminated on the coating layer in a partially cured state while purging with nitrogen so that the surface of the barrier layer was in contact with the surface of the coating layer. Then, using an air-cooled metal halide lamp (manufactured by Eye Graphics Co., Ltd.) at an irradiation intensity of 320 W/cm$^2$, the coating layer was sufficiently cured by irradiation with ultraviolet rays from the second substrate side.

In this manner, the wavelength conversion member (wavelength conversion film) of Example 1 was prepared.

Example 2

A wavelength conversion member was prepared in the same manner as in Example 1, except that, in the preparation of the substrate, a thinner barrier layer was formed by shortening the vacuum vapor deposition time during film formation of the barrier layer.

Example 3

A wavelength conversion member was prepared in the same manner as in Example 1, except that, in the preparation of the substrate, a thicker barrier layer was formed by lengthening the vacuum vapor deposition time during film formation of the barrier layer.

Example 4

A wavelength conversion member was prepared in the same manner as in Example 1, except that, in the preparation of the substrate, $SiO_2$ and $Al_2O_3$ were used in the same amount on a mass basis as the vacuum vapor deposition materials during film formation of the barrier layer (inorganic substance of the barrier layer: see Table 1).

Example 5

A wavelength conversion member was prepared in the same manner as in Example 1, except that, in the preparation of the wavelength conversion layer, the following quantum dot-containing polymerizable composition 2 was prepared, filtered through a polypropylene filter having a pore diameter of 50 μm, dried under reduced pressure for 60 minutes, and used as a coating liquid.

| Quantum dot-containing polymerizable composition 2 | |
| --- | --- |
| Toluene dispersion liquid of quantum dots 1 (emission maximum: 530 nm) | 7 parts by mass |
| Toluene dispersion liquid of quantum dots 2 (emission maximum: 620 nm) | 3 part by mass |
| Lauryl acrylate (LA, manufactured by Shin-Nakamura Chemical Co., Ltd.) | 2.4 parts by mass |
| Trimethylolpropane triacrylate (A-TMPT, manufactured by Shin-Nakamura Chemical Co., Ltd.) | 0.54 parts by mass |
| Photopolymerization initiator (IRGACURE 819, manufactured by BASF SE) | 0.009 parts by mass |
| Light-scattering particles (TOSPEARL 120, manufactured by Momentive Performance Materials Inc.) | 1 part by mass |

Example 6

A wavelength conversion member was prepared in the same manner as in Example 1, except that, in the preparation of the wavelength conversion layer, the following quantum dot-containing polymerizable composition 3 was prepared, filtered through a polypropylene filter having a pore diameter of 50 μm, dried under reduced pressure for 60 minutes, and used as a coating liquid.

| Quantum dot-containing polymerizable composition 3 | |
| --- | --- |
| Toluene dispersion liquid of quantum dots 1 (emission maximum: 530 nm) | 7 parts by mass |
| Toluene dispersion liquid of quantum dots 2 (emission maximum: 620 nm) | 3 parts by mass |
| Trimethylolpropane triacrylate (A-TMPT, manufactured by Shin-Nakamura Chemical Co., Ltd.) | 2.94 parts by mass |
| Photopolymerization initiator (IRGACURE 819, manufactured by BASF SE) | 0.009 parts by mass |
| Light-scattering particles (TOSPEARL 120, manufactured by Momentive Performance Materials Inc.) | 1 part by mass |

Examples 7 and 8

A wavelength conversion member was prepared in the same manner as in Example 1, except that, in the preparation of the wavelength conversion layer, the application amount of the coating liquid was changed to form a thicker wavelength conversion layer.

Example 9

In the preparation of the wavelength conversion member, a mold with regular hexagonal pattern grooves having a groove width of 50 μm and a pitch of 250 μm was prepared, the mold was filled with a composition 1 for forming a resin layer, the first substrate prepared in the same manner as in Example 1 was laminated so that the surface of the barrier layer was in contact with the composition 1 for forming a resin layer, and excess composition 1 for forming a resin layer was extruded with a rubber roller, followed by irradiation with ultraviolet rays using an air-cooled metal halide lamp (manufactured by Eye Graphics Co., Ltd.) at an irradiation intensity of 160 W/cm$^2$.

Then, the mold was peeled off from the first substrate to obtain a substrate with a resin layer having a plurality of discretely formed concave portions.

Next, the substrate with a resin layer was filled with the quantum dot-containing polymerizable composition 1, and a second substrate prepared in the same manner as in Example 1 was laminated while purging with nitrogen so that the surface of the barrier layer was in contact with the quantum dot-containing polymerizable composition 1. This was followed by irradiation with ultraviolet rays from the second substrate side, using an air-cooled metal halide lamp (manufactured by Eye Graphics Co., Ltd.) at an irradiation intensity of 320 W/cm$^2$, thereby preparing a wavelength conversion member.

| Composition 1 for forming resin layer | |
| --- | --- |
| Triallyl isocyanurate (TAIC, manufactured by Mitsubishi Chemical Corporation) | 31.6 parts by mass |
| Pentaerythritol tetrakis(3-mercaptopropionate) (PEMP, manufactured by SC Organic Chemical Co., Ltd.) | 48 parts by mass |
| Photopolymerization initiator (IRGACURE 819, manufactured by BASF SE) | 0.4 parts by mass |
| Light-scattering particles (TOSPEARL 120, manufactured by Momentive Performance Materials Inc.) | 20 parts by mass |

Example 10

A wavelength conversion member was prepared in the same manner as in Example 1, except that, in the preparation of the substrate, the following organic layer was provided on the barrier layer.

<Formation of Organic Layer>

An organic layer was formed on the surface of the barrier layer of the prepared substrate with a barrier layer (first substrate and second substrate) by the following procedure.

First, the following composition 1 for forming an organic layer was prepared and used as a coating liquid.

Next, this coating liquid was directly applied onto the surface of the barrier layer using a bar coater (bar number: #5), and dried in a dryer having an internal atmosphere temperature of 100° C. for 3 minutes. This was followed by irradiation with ultraviolet rays (integrated irradiation dose: about 300 mJ/cm$^2$) for curing in a nitrogen purge environment at a temperature of 25° C., thereby preparing a substrate in which an organic layer, a barrier layer, and a support were laminated in this order.

| Composition 1 for forming organic layer | |
| --- | --- |
| Polyfunctional acrylamide (FAM-401, manufactured by FUJIFILM Corporation) | 14.5 parts by mass |
| Photopolymerization initiator (IRGACURE 819, manufactured by BASF SE) | 0.5 parts by mass |
| Methyl ethyl ketone | 30 parts by mass |
| Methanol | 55 parts by mass |

Example 11

A wavelength conversion member was prepared in the same manner as in Example 10, except that, in the formation of the organic layer, the following composition 2 for forming an organic layer was used instead of the composition 1 for forming an organic layer.

| Composition 2 for forming organic layer | |
| --- | --- |
| Polyfunctional acrylamide (FAM-301, manufactured by FUJIFILM Corporation) | 14.5 parts by mass |
| Photopolymerization initiator (IRGACURE 819, manufactured by BASF SE) | 0.5 parts by mass |
| Methyl ethyl ketone | 30 parts by mass |
| Methanol | 55 parts by mass |

Example 12

A wavelength conversion member was prepared in the same manner as in Example 1, except that, in the preparation of the substrate, LUMIRROR S10-#25 (manufactured by Toray Industries, Inc.) was used instead of LUMIRROR S10-#12 (manufactured by Toray Industries, Inc.) as the support.

Example 13

A wavelength conversion member was prepared in the same manner as in Example 10, except that, in the formation of the organic layer, the following composition 3 for forming an organic layer was used instead of the composition 1 for forming an organic layer.

| Composition 3 for forming organic layer | |
| --- | --- |
| Cyclic polyolefin: APL6011T (manufactured by Mitsui Chemicals, Inc.) | 30.0 parts by mass |
| Alicyclic methacrylate compound: DCP (manufactured by Shin-Nakamura Chemical Co., Ltd.) | 65.0 parts by mass |
| Rosin compound: PINECRYSTAL KR614 (manufactured by Arakawa Chemical Industries, Ltd.) | 5.0 parts by mass |
| Photopolymerization initiator (IRGACURE 184, manufactured by BASF SE) | 6.0 parts by mass |
| Methylcyclohexane | 600.7 parts by mass |

Comparative Example 1

A wavelength conversion member was prepared in the same manner as in Example 1, except that the substrate obtained by the following procedure was used as the first substrate and the second substrate.

The temperature of a liquid was raised to 70° C. while stirring 230 parts by mass of distilled water. 88 parts by mass of aluminum isopropoxide manufactured by TCI was added to the distilled water, and the temperature of the liquid was raised to 95° C. Next, 4.0 parts by mass of a 60% by mass nitric acid aqueous solution were added thereto, followed by stirring at 95° C. for 3 hours to obtain a dispersion liquid S1.

In addition, 42.85 parts by mass of distilled water and 19.00 parts by mass of methanol were added to 1.76 parts by mass of a phosphoric acid aqueous solution having a concentration of 85% by mass, followed by stirring to obtain a solution T1.

Subsequently, 35.00 parts by mass of the dispersion liquid (S1) was added dropwise in a state where the solution (T1) was stirred, and stirring was continued for about 30 minutes to prepare a coating liquid.

Next, using LUMIRROR S10-#12 (manufactured by Toray Industries, Inc.) as a support, one surface of the support was coated with the coating liquid by a bar coater, and pre-drying was carried out for 5 minutes in a dryer having an internal atmosphere temperature of 100° C. Further, post-drying was carried out for 1 minute at an internal atmosphere temperature of 160° C. in the dryer to prepare a substrate (first substrate and second substrate).

The barrier layer of the substrate thus prepared is an inorganic layer containing, as an inorganic substance, a dehydration condensate of a hydrolyzate of aluminum isopropoxide and phosphoric acid (complex of alumina and phosphoric acid).

Comparative Example 2

A wavelength conversion member was prepared in the same manner as in Example 1, except that, in Comparative Example 1, the application amount of the coating liquid was changed to form a thinner barrier layer.

Comparative Example 3

A wavelength conversion member was prepared in the same manner as in Example 1, except that, in the preparation of the substrate, a thicker barrier layer was formed by lengthening the vacuum vapor deposition time during film formation of the barrier layer.

Reference Example 1

A wavelength conversion member was prepared in the same manner as in Example 1, except that, in the preparation of the wavelength conversion layer, the application amount of the coating liquid was changed to form a thicker wavelength conversion layer.

[Evaluation Method]

Hereinafter, an evaluation method for the prepared wavelength conversion members will be described.

<Thickness of Barrier Layer>

At a randomly selected position of the wavelength conversion member, cutting was carried out with a RETOR-ATOME REM-710 (manufactured by Yamato Kohki Industrial Co., Ltd.) to expose a cross section in a thickness direction. The exposed cross section was observed with a scanning electron microscope 5-4800 (manufactured by Hitachi High-Tech Corporation), and the thickness of the barrier layer was obtained from the obtained image.

<Various Thicknesses>

The total thickness of the wavelength conversion member and the thicknesses of various layers other than the barrier layer were obtained by using a Millimar 1240 (manufactured by Mahr GmbH) as a contact type film thickness meter at one randomly selected location of a wavelength conversion member to be measured.

<Elastic Modulus of Wavelength Conversion Member>

The elastic modulus of the support was obtained by the method described above using a universal testing machine (universal material testing machine TENSILON RTF-1310, manufactured by Orientec Co., Ltd.).

<Elastic Modulus of Support>

The elastic modulus of the support was obtained by the method described above using a universal testing machine (universal material testing machine TENSILON RTF-1310, manufactured by Orientec Co., Ltd.).

<Elastic Modulus of Wavelength Conversion Layer>

The elastic modulus of the wavelength conversion layer was obtained by the method described above using VIBRON: DVA-225 (manufactured by IT Keisoku Seigyo K.K.) as the dynamic viscoelasticity measuring device.

<Elastic Modulus of Barrier Layer>

The elastic modulus of the barrier layer was obtained by the method described above using a cube corner indenter with a nanotriboindenter TI-950 (manufactured by Bruker Corporation).

<Rub Resistance>

The rub resistance was evaluated by the method described above using a surface property tester TRIBOGEAR TYPE: 14 (manufactured by Shinto Scientific Co., Ltd.). In imaging with a digital camera, MB-OBL9X9-B-24-O-ILD (manufactured by Metaphase Technologies Inc.) was used as the blue plane light source. The imaging was carried out by turning on the blue plane light source under the conditions of a voltage of 19.3 V and a current of 0.88 A, and attaching a long-pass filter (VIS OG 515 manufactured by Edmund Optics, Inc.) to the lens of the digital camera.

<Bend Resistance>

The bend resistance was obtained by the method described above. In imaging with a digital camera, MB-OBL9X9-B-24-O-ILD (manufactured by Metaphase Technologies Inc.) was used as the blue plane light source. The imaging was carried out by turning on the blue plane light source under the conditions of a voltage of 19.3 V and a current of 0.88 A, and attaching a long-pass filter (VIS OG 515 manufactured by Edmund Optics, Inc.) to the lens of the digital camera.

The results are shown in Table 1 and Table 2 which will be described later. In Table 2, the value of "$(E_b \times d_b^3)/(E_w \times d_w^3)$" was calculated from the thickness and the elastic modulus of the barrier layer obtained above, and the thickness and the elastic modulus of the wavelength conversion layer obtained above. In the calculated value, ".E+04" represents exponentiation as is well known, and ".E+04" means "$\times 10^4$". The same applies to the other exponentiation representations in Table 2. In Table 2, the value of "$E_t \times d_t^3$" was calculated from the total thickness and the elastic modulus of the wavelength conversion member obtained above. In Table 2, the value of "(rub resistance/$(E_t \times d_t^3)$)×1000000" was calculated from the rub resistance, the total thickness, and the elastic modulus of the wavelength conversion member obtained above.

In Table 1, the column of "Polymerizable compound" in the column of "Wavelength conversion layer" shows the above-described trade name of the (meth)acrylate contained in the quantum dot-containing polymerizable composition used for forming each wavelength conversion layer.

<Evaluation of Non-Light Emission Failure>

After 10 sample films having a size of 297 mm×210 mm were cut out from a wavelength conversion member to be evaluated, the 10 films were accumulated, and each one was taken out from the accumulated sample film group and subjected to the following evaluation.

Foreign matters on both sides of the film were removed using a weakly viscous roller (Hand Cleaner II DCR, manufactured by AS ONE Corporation).

Next, using a diffuser plate and a prism sheet prepared by disassembling a commercially available monitor, the diffuser plate, the sample film, and two prism sheets were laminated in this order to prepare a laminate.

The laminate was stored for 168 hours in an environment with a temperature of 85° C. and a relative humidity of 0%, and then the surface of the diffuser plate of the laminate was imaged using a digital camera under an LED blue plane light source having a light source wavelength of 450 nm. MB-OBL9X9-B-24-O-ILD (manufactured by Metaphase Technologies Inc.) was used as the blue plane light source. The imaging was carried out by turning on the blue plane light source under the conditions of a voltage of 19.3 V and a current of 0.88 A, and attaching a long-pass filter (VIS OG 515 manufactured by Edmund Optics, Inc.) to the lens of the digital camera. Assuming that the average gray value of the entire surface of the sample was 100% in the plane, it was evaluated whether or not there was a defect with a gray value difference of 15% or more and a size of 1 mm or more. The gray value was calculated from the RGB values obtained from the captured image using the following expression.

Gray value=$R$ value×0.3+$G$ value×0.59+1$B$ value×0.11    Expression)

From the number of sample films containing defects, the non-light emission failure was evaluated according to the following standards. It can be said that the smaller the number of sample films containing defects, the more suppressed the occurrence of non-light emission failure. Table 3 shows the number of sample films containing defects and the evaluation results based on the following standards.

(Evaluation Standards)

A: The number of sample films with non-light emission failure is 0.
B: The number of sample films with non-light emission failure is 1.
C: The number of sample films with non-light emission failure is 2.
D: The number of sample films with non-light emission failure is 3 or more.

<Evaluation of Detectability>

A sample film having a size of 35 mm×120 mm was cut out from a wavelength conversion member to be evaluated, and the sample film was placed in an environment with a temperature of 25° C. and a relative humidity of 60% for 1 hour or more for humidity conditioning. Then, in the same environment, a rubbing test was carried out in the same manner as the evaluation of the rub resistance, using a surface property tester TRIBOGEAR TYPE: 14 (manufactured by Shinto Scientific Co., Ltd.).

The sample film subjected to the rubbing test was visually observed immediately after the test for the presence or absence of surface dents by reflected light under a white light source, and a minimum value L1 of a load at which dents were confirmed (a vertical load applied to the indenter during the reciprocating movement on the surface of the sample film at which dents were confirmed) was recorded.

Next, the sample film was stored for 168 hours in an environment with a temperature of 85° C. and a relative humidity of 0%, and then a surface of the sample film on the side where the indenter was reciprocated was imaged using a digital camera under an LED blue plane light source having a light source wavelength of 450 nm. MB-OBL9X9-B-24-O-ILD (manufactured by Metaphase Technologies Inc.) was used as the blue plane light source. The imaging was carried out by turning on the blue plane light source under the conditions of a voltage of 19.3 V and a current of 0.88 A, and attaching a long-pass filter (VIS OG 515 manufactured by Edmund Optics, Inc.) to the lens of the digital camera. Similar to the evaluation of the rub resistance, assuming that the gray value of an untested portion is 100%, a minimum value L2 of a load at which the gray value difference is 15% or more (a vertical load applied to the indenter during the reciprocating movement on the surface of the sample film, which was the above-mentioned gray value difference) was obtained. The detectability was evaluated based on the following standards from the calculated value of P with a ratio P=L1/L2. The evaluation results are shown in Table 3.

(Evaluation Standards)

A: $1.2 \leq P$
B: $1.0 \leq P < 1.2$
C: $0.8 \leq P < 1.0$
D: $P < 0.8$

TABLE 1

| | Support | | Barrier layer | | | Organic layer | | | Wavelength conversion layer | | | |
| | | | | | | | | Thick- | | | | |
| | Elastic modulus [GPa] | Thickness [μm] | Elastic modulus $E_b$ [GPa] | Thickness $d_b$ [μm] | Inorganic substance | Material | Thickness [μm] | ness of substrate [μm] | Elastic modulus $E_w$ [GPa] | Thickness $d_w$ [μm] | Polymerizable compound | Resin layer |
|---|---|---|---|---|---|---|---|---|---|---|---|---|
| Example 1 | 4.4 | 12 | 10.9 | 0.20 | Silicon oxide | — | — | 12 | 2.8 | 40 | IBXA/A-TMPT | — |
| Example 2 | 4.4 | 12 | 9.5 | 0.05 | Silicon oxide | — | — | 12 | 2.8 | 40 | IBXA/A-TMPT | — |
| Example 3 | 4.4 | 12 | 13.1 | 0.50 | Silicon oxide | — | — | 13 | 2.8 | 40 | IBXA/A-TMPT | — |
| Example 4 | 4.4 | 12 | 21.5 | 0.20 | Silicon oxide/aluminum oxide | — | — | 12 | 2.8 | 40 | IBXA/A-TMPT | — |

TABLE 1-continued

| | Support | | Barrier layer | | | Organic layer | | | Wavelength conversion layer | | | |
|---|---|---|---|---|---|---|---|---|---|---|---|---|
| | Elastic modulus [GPa] | Thickness [μm] | Elastic modulus $E_b$ [GPa] | Thickness $d_b$ [μm] | Inorganic substance | Material | Thickness [μm] | Thickness of substrate [μm] | Elastic modulus $E_w$ [GPa] | Thickness $d_w$ [μm] | Polymerizable compound | Resin layer |
| Example 5 | 4.4 | 12 | 10.9 | 0.20 | Silicon oxide | — | — | 12 | 1.1 | 40 | LA/A-TMPT | — |
| Example 6 | 4.4 | 12 | 10.9 | 0.20 | Silicon oxide | — | — | 12 | 4.5 | 40 | A-TMPT | — |
| Example 7 | 4.4 | 12 | 10.9 | 0.20 | Silicon oxide | — | — | 12 | 2.8 | 90 | IBXA/A-TMPT | — |
| Example 8 | 4.4 | 12 | 10.9 | 0.20 | Silicon oxide | — | — | 12 | 2.8 | 80 | IBXA/A-TMPT | — |
| Example 9 | 4.4 | 12 | 10.9 | 0.20 | Silicon oxide | — | — | 12 | 3.1 | 40 | IBXA/A-TMPT | Present |
| Example 10 | 4.4 | 12 | 10.9 | 0.20 | Silicon oxide | FAM-401 | 1 | 13 | 2.8 | 40 | IBXA/A-TMPT | — |
| Example 11 | 4.4 | 12 | 10.9 | 0.20 | Silicon oxide | FAM-301 | 1 | 13 | 2.8 | 40 | IBXA/A-TMPT | — |
| Example 12 | 4.4 | 12 | 10.9 | 0.20 | Silicon oxide | — | — | 25 | 2.8 | 40 | IBXA/A-TMPT | — |
| Example 13 | 4.4 | 12 | 10.9 | 0.20 | Silicon oxide | APL6011T/DCP | 1 | 13 | 2.8 | 40 | IBXA/A-TMPT | — |
| Comparative Example 1 | 4.4 | 12 | 40.5 | 0.50 | Complex of alumina and phosphoric acid | — | — | 13 | 2.8 | 40 | IBXA/A-TMPT | — |
| Comparative Example 2 | 4.4 | 12 | 33.9 | 0.40 | Complex of alumina and phosphoric acid | — | — | 12 | 2.8 | 40 | IBXA/A-TMPT | — |
| Comparative Example 3 | 4.4 | 12 | 12.7 | 1.20 | Silicon oxide | — | — | 13 | 2.8 | 40 | IBXA/A-TMPT | — |
| Reference Example 1 | 4.4 | 12 | 10.9 | 0.20 | Silicon oxide | — | — | 12 | 2.8 | 100 | IBXA/A-TMPT | — |

TABLE 2

| | Total thickness $d_t$ [μm] | Elastic modulus $E_t$ [GPa] | $E_t \times d_t^3$ | Bend resistance φ [mm] | $(E_w \times d_w^3)/(E_b \times d_b^3)$ | Rub resistance [g] | (Rub resistance/$(E_t \times d_t^3)$) × 1000000 |
|---|---|---|---|---|---|---|---|
| Example 1 | 64 | 3.4 | 9.2.E+05 | 2 | 2.1.E+06 | 300 | 326 |
| Example 2 | 64 | 3.4 | 9.0.E+05 | 2 | 1.5.E+08 | 500 | 557 |
| Example 3 | 65 | 3.5 | 9.7.E+05 | 2 | 1.1.E+05 | 150 | 154 |
| Example 4 | 64 | 3.5 | 9.4.E+05 | 2 | 1.0.E+06 | 250 | 266 |
| Example 5 | 64 | 2.4 | 6.4.E+05 | 2 | 8.1.8+05 | 200 | 313 |
| Example 6 | 64 | 4.5 | 1.2.E+06 | 2 | 3.3.E+06 | 300 | 249 |
| Example 7 | 84 | 3.3 | 2.0.E+06 | 3 | 6.9.E+06 | 400 | 202 |
| Example 8 | 104 | 3.2 | 3.6.E+06 | 4 | 1.6.E+07 | 450 | 124 |
| Example 9 | 64 | 3.6 | 9.7.E+05 | 2 | 2.3.E+06 | 300 | 309 |
| Example 10 | 66 | 3.3 | 9.8.E+05 | 2 | 2.1.E+06 | 350 | 358 |
| Example 11 | 66 | 3.3 | 9.8.E+05 | 2 | 2.1.E+06 | 350 | 358 |
| Example 12 | 90 | 3.7 | 2.7.E+06 | 3 | 2.1.E+06 | 300 | 111 |
| Example 13 | 66 | 3.3 | 9.8.E+05 | 2 | 2.1.E-06 | 335 | 342 |
| Comparative Example 1 | 65 | 4.0 | 1.1.E+06 | 2 | 3.5.E+04 | 10 | 9 |
| Comparative Example 2 | 65 | 3.8 | 1.0.E+06 | 2 | 8.3.E+04 | 50 | 49 |
| Comparative Example 3 | 66 | 3.7 | 1.1.E+06 | 2 | 8.2.E+03 | 10 | 9 |
| Reference Example 1 | 124 | 3.1 | 6.0.E+06 | 5 | 3.2.E+07 | 450 | 75 |

TABLE 3

| | Evaluation | |
|---|---|---|
| | Non-light emission failure | Detectability |
| Example 1 | B | 1 sample film A |
| Example 2 | A | 0 sample film A |
| Example 3 | C | 2 sample films C |
| Example 4 | B | 1 sample film B |
| Example 5 | B | 1 sample film A |
| Example 6 | B | 2 sample films C |

TABLE 3-continued

| | Evaluation | | |
|---|---|---|---|
| | Non-light emission failure | Detectability | |
| Example 7 | A | 0 sample film | C |
| Example 8 | A | 0 sample film | C |
| Example 9 | B | 1 sample film | A |
| Example 10 | A | 0 sample film | A |
| Example 11 | A | 0 sample film | A |
| Example 12 | B | 1 sample film | C |
| Example 13 | A | 0 sample film | A |
| Comparative Example 1 | D | 6 sample films | D |
| Comparative Example 2 | D | 8 sample films | C |
| Comparative Example 3 | D | 9 sample films | D |
| Reference Example 1 | A | 0 sample film | C |

One aspect of the present invention is useful in the technical field of a liquid crystal display device.

EXPLANATION OF REFERENCES

10: wavelength conversion member
12: first substrate
12a, 14a: support film
12b, 14b: barrier layer
14: second substrate
16: wavelength conversion layer
18: resin layer
18a: concave portion
20: quantum dot-containing region
24, 24e: quantum dot
26: matrix
34: underlying organic layer
36: barrier layer
38: protective organic layer
50: backlight unit
52A: light source
52B: light guide plate
52C: planar light source
54: wavelength conversion member
56A: reflecting plate
56B: retroreflective member
60: liquid crystal display device
62: liquid crystal cell unit
64: liquid crystal cell
68, 70: polarizing plate
72, 74: polarizer
76, 78, 82, 84: polarizing plate protective film
L1: composition for forming resin layer
L2: quantum dot-containing polymerizable composition
M: mold

What is claimed is:

1. A wavelength conversion member comprising:
a wavelength conversion layer containing quantum dots,
wherein the wavelength conversion layer is provided between two substrates,
at least one of the two substrates includes a barrier layer,
the wavelength conversion member has a total thickness of 120 μm or less,
the wavelength conversion member has a rub resistance of 100 g or more, and
the wavelength conversion member exhibits a bend resistance of a mandrel diameter of 4 mm or less in a bend resistance test carried out according to a cylindrical mandrel method specified in JIS K 5600-5-1:1999.

2. The wavelength conversion member according to claim 1,
wherein the wavelength conversion member satisfies the following expression:

$$1.0\times10^5 < (E_w \times d_w^3)/(E_b \times d_b^3) < 1.0\times10^9,$$

in the expression, $E_b$ is an elastic modulus of the barrier layer, $d_b$ is a thickness of the barrier layer, $E_w$ is an elastic modulus of the wavelength conversion layer, and $d_w$ is a thickness of the wavelength conversion layer, where a unit of the elastic modulus is GPa, and a unit of the thickness is m.

3. The wavelength conversion member according to claim 1,
wherein the thickness of the barrier layer is in a range of 0.03 to 0.60 μm.

4. The wavelength conversion member according to claim 1,
wherein the barrier layer is a layer containing an inorganic oxide selected from the group consisting of a silicon oxide and an aluminum oxide.

5. The wavelength conversion member according to claim 1,
wherein the thickness of the wavelength conversion layer is 70 μm or less.

6. The wavelength conversion member according to claim 1,
wherein the substrate having the barrier layer includes the barrier layer and a support, and
a thickness of the support is in a range of 10 to 30 μm.

7. The wavelength conversion member according to claim 6,
wherein the wavelength conversion member has the barrier layer between the wavelength conversion layer and the support.

8. The wavelength conversion member according to claim 1,
wherein the substrate containing the barrier layer further has an organic layer containing a (meth)acrylamide compound.

9. The wavelength conversion member according to claim 8,
wherein the wavelength conversion member has the organic layer between the barrier layer and the wavelength conversion layer.

10. The wavelength conversion member according to claim 1,
wherein the substrate containing the barrier layer further has an organic layer containing a compound having an alicyclic structure.

11. The wavelength conversion member according to claim 10,
wherein the wavelength conversion member has the organic layer between the barrier layer and the wavelength conversion layer.

12. The wavelength conversion member according to claim 1,
wherein the wavelength conversion layer further contains a (meth)acrylic resin.

13. The wavelength conversion member according to claim 1,
wherein the wavelength conversion layer has a region containing the quantum dots and a resin layer region having a plurality of concave portions, and the region containing the quantum dots is included in the concave portion.

14. The wavelength conversion member according to claim 1,
wherein the wavelength conversion layer is a cured product obtained by curing a polymerizable composition containing the quantum dots into a film.

15. Alight emitting device comprising:
the wavelength conversion member according to claim 1; and
a light source.

16. The light emitting device according to claim 15,
wherein the light source is selected from the group consisting of a blue light emitting diode and an ultraviolet light emitting diode.

17. A liquid crystal display device comprising:
the light emitting device according to claim 15; and
a liquid crystal cell.

18. The liquid crystal display device according to claim 17,
wherein the light source is selected from the group consisting of a blue light emitting diode and an ultraviolet light emitting diode.

* * * * *